US010681633B2

(12) United States Patent
Ang et al.

(10) Patent No.: US 10,681,633 B2
(45) Date of Patent: Jun. 9, 2020

(54) CONFIGURABLE SUBFRAME STRUCTURES IN WIRELESS COMMUNICATION

(71) Applicant: QUALCOMM Incorporated, San Diego, CA (US)

(72) Inventors: Peter Pui Lok Ang, San Diego, CA (US); Tao Luo, San Diego, CA (US); Joseph Binamira Soriaga, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 15/271,439

(22) Filed: Sep. 21, 2016

(65) Prior Publication Data

US 2017/0289907 A1    Oct. 5, 2017

Related U.S. Application Data

(60) Provisional application No. 62/318,616, filed on Apr. 5, 2016.

(51) Int. Cl.
*H04W 52/02* (2009.01)
*H04W 72/12* (2009.01)
*H04W 72/04* (2009.01)

(52) U.S. Cl.
CPC ... *H04W 52/0216* (2013.01); *H04W 72/0446* (2013.01); *H04W 72/1289* (2013.01); *Y02D 70/1222* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/26* (2018.01)

(58) Field of Classification Search
None
See application file for complete search history.

(56) References Cited

U.S. PATENT DOCUMENTS

2009/0303951 A1* 12/2009 Lunttila ............... H04L 1/0026
370/329
2011/0250897 A1* 10/2011 Seo ..................... H04B 7/2606
455/445

(Continued)

FOREIGN PATENT DOCUMENTS

WO    WO-2016040290 A1    3/2016

OTHER PUBLICATIONS

International Search Report and Written Opinion—PCT/US2017/025795—ISA/EPO—dated Jul. 10, 2017.

*Primary Examiner* — Jeffrey M Rutkowski
*Assistant Examiner* — Ning Li
(74) *Attorney, Agent, or Firm* — Loza & Loza, LLP/Qualcomm

(57) ABSTRACT

Some aspects of the disclosure provide for a flexible and reconfigurable subframe structure that allows various devices with different capabilities and frequency agility to efficiently utilize the available channel bandwidth (BW) and/or save power. In some aspects of the disclosure, the reference signal and/or control channel placement in the subframe can facilitate faster processing and increased sleep mode duration of the devices.

30 Claims, 19 Drawing Sheets

(56) References Cited

U.S. PATENT DOCUMENTS

| | | | |
|---|---|---|---|
| 2013/0294309 A1* | 11/2013 | Choi | H04W 52/0209 370/311 |
| 2014/0071954 A1* | 3/2014 | Au | H04W 72/0446 370/336 |
| 2014/0254452 A1* | 9/2014 | Golitschek Edler Von Elbwart | H04W 52/0216 370/311 |
| 2015/0282127 A1* | 10/2015 | Park | H04L 5/0053 370/329 |
| 2016/0014718 A1* | 1/2016 | Mysore Balasubramanya | H04W 68/02 455/458 |
| 2016/0088604 A1 | 3/2016 | Patel et al. | |
| 2016/0127952 A1* | 5/2016 | You | H04W 28/20 370/252 |
| 2016/0127991 A1* | 5/2016 | Ang | H04W 52/0206 455/522 |
| 2016/0128095 A1 | 5/2016 | Damnjanovic et al. | |
| 2017/0105206 A1* | 4/2017 | Maattanen | H04L 5/0037 |
| 2017/0208574 A1* | 7/2017 | Ramakrishna | H04L 5/0055 |
| 2017/0245260 A1* | 8/2017 | Islam | H04L 5/0053 |
| 2017/0273059 A1* | 9/2017 | You | H04L 25/03 |
| 2017/0290008 A1* | 10/2017 | Tooher | H04L 1/0007 |
| 2018/0309496 A1* | 10/2018 | Lee | H04L 5/0044 |
| 2018/0310283 A1* | 10/2018 | Deenoo | H04W 72/042 |

\* cited by examiner

CONFIGURABLE SUBFRAME STRUCTURES IN WIRELESS COMMUNICATION

PRIORITY CLAIM

This application claims priority to and the benefit of provisional patent application No. 62/318,616 filed in the United States Patent and Trademark Office on Apr. 5, 2016, the entire content of which is incorporated herein by reference as if fully set forth below in its entirety and for all applicable purposes.

TECHNICAL FIELD

The technology discussed below relates generally to wireless communication systems, and more particularly, to reconfigurable subframe structures for wireless communication and communication methods utilizing reconfigurable subframe structures.

INTRODUCTION

Wireless communication networks are widely deployed to provide various communication services such as telephony, video, data, messaging, broadcasts, and so on. Such networks, which are usually multiple access networks, support communications for multiple users by sharing the available network resources. Within such wireless networks a variety of data services may be provided, including voice, video, and emails, etc.

More recently, wireless communication networks are being utilized for an even broader range of services for various types of devices with different capabilities. While some devices can fully utilize the available bandwidth of the communication channels, some devices have limited or lesser ability to utilize the full bandwidth and/or need to conserve power to extend operating time, especially for battery powered devices. However, in current communication standards such as Long-Term Evolution (LTE), certain aspects of the downlink subframe structure may limit the extent of power saving and spectral efficiency, especially if extended to a wider bandwidth implementation of the next generation networks or 5G networks.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Some aspects of the disclosure provide for a flexible and reconfigurable subframe structure that allows various devices with different capabilities and frequency agility to efficiently utilize the available channel bandwidth (BW) and/or save power. In some aspects of the disclosure, the reference signal(s) and/or control channel placement in the subframe can facilitate faster processing and increased sleep mode duration of the devices.

One aspect of the present disclosure provides a method of wireless communication operable at a scheduling entity. The scheduling entity communicates with one or more subordinate entities including a first subordinate entity and a second subordinate entity utilizing a multi-transmission time interval (TTI) subframe including two or more transmission time intervals. The scheduling entity transmits scheduling information to the first subordinate entity to utilize a first transmission time interval (TTI) of the two or more transmission time intervals, and transmits scheduling information to the second subordinate entity to utilize a second TTI of the two or more transmission time intervals. The first TTI and the second TTI may have different time durations.

Another aspect of the present disclosure provides a scheduling entity configured for wireless communication. The scheduling entity includes a communication interface configured to communicate with one or more subordinate entities, a memory including executable code, and a processor coupled to the communication interface and the memory. The processor is configured by the executable code to communicate with the one or more subordinate entities including a first subordinate entity and a second subordinate entity utilizing a multi-transmission time interval (TTI) subframe including two or more transmission time intervals. The processor is further configured to transmit scheduling information to the first subordinate entity to utilize a first transmission time interval (TTI) of the two or more transmission time intervals, and transmit scheduling information to the second subordinate entity to utilize a second TTI of the two or more transmission time intervals. The first TTI and the second TTI may have different time durations.

Another aspect of the present disclosure provides a scheduling entity configured for wireless communication. The scheduling entity includes means for communicating with one or more subordinate entities including a first subordinate entity and a second subordinate entity utilizing a multi-transmission time interval (TTI) subframe including two or more transmission time intervals. The scheduling entity further includes means for transmitting scheduling information to the first subordinate entity to utilize a first transmission time interval (TTI) of the two or more transmission time intervals. The scheduling entity further includes means for transmitting scheduling information to the second subordinate entity to utilize a second TTI of the two or more transmission time intervals. The first TTI and the second TTI may have different time durations.

Another aspect of the present disclosure provides a computer-readable storage medium including executable code. The code causes a scheduling entity to communicate with one or more subordinate entities including a first subordinate entity and a second subordinate entity utilizing a multi-transmission time interval (TTI) subframe including two or more transmission time intervals. The code further causes the scheduling entity to transmit scheduling information to the first subordinate entity to utilize a first transmission time interval (TTI) of the two or more transmission time intervals. The code further causes the scheduling entity to transmit scheduling information to the second subordinate entity to utilize a second TTI of the two or more transmission time intervals. The first TTI and the second TTI may have different time durations.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide a flexible and reconfigurable subframe structure that may be utilized in the next generation or 5G wireless communication networks. The subframe structure has a flexibility that allows various devices with different capabilities and frequency agility to efficiently utilize the available channel bandwidth (BW) and/or save power. In some aspects of the disclosure, the reference signal and control channel placement in a subframe can facilitate faster processing and can increase the duration of a sleep mode of the devices.

Figure 1:
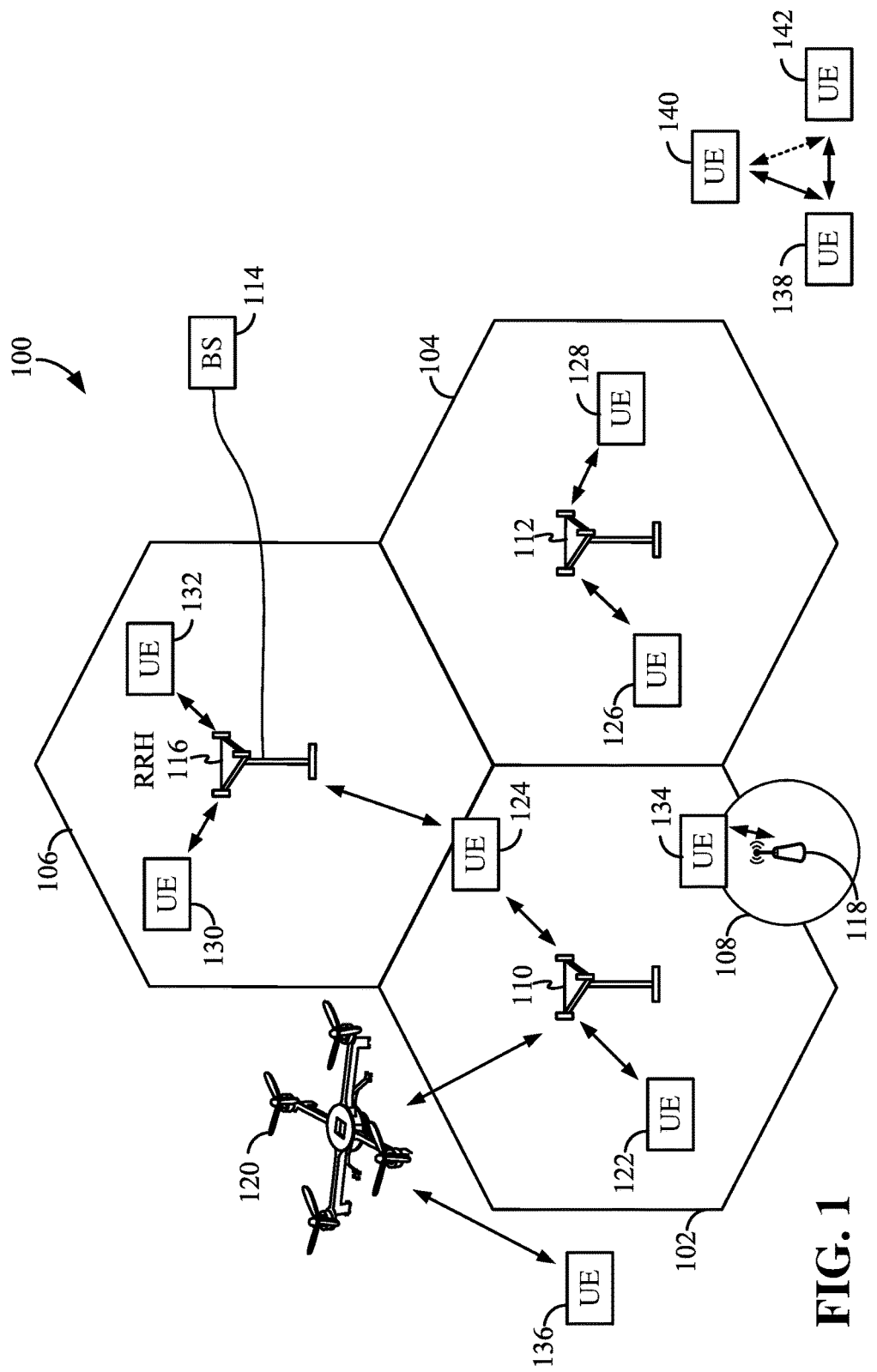
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. The UEs may communicate with the corresponding base stations using the various subframe structures described below in relation to FIGS. 9-17.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes. In some examples, the access network 100 may utilize self-contained subframes to communicate with the UEs similar to those illustrated in FIGS. 9-17.

Within the access network 100, during a call with a scheduling entity (e.g., base station 114), or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Examples of the resources include time and/or frequency resources that may be called a resource block.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
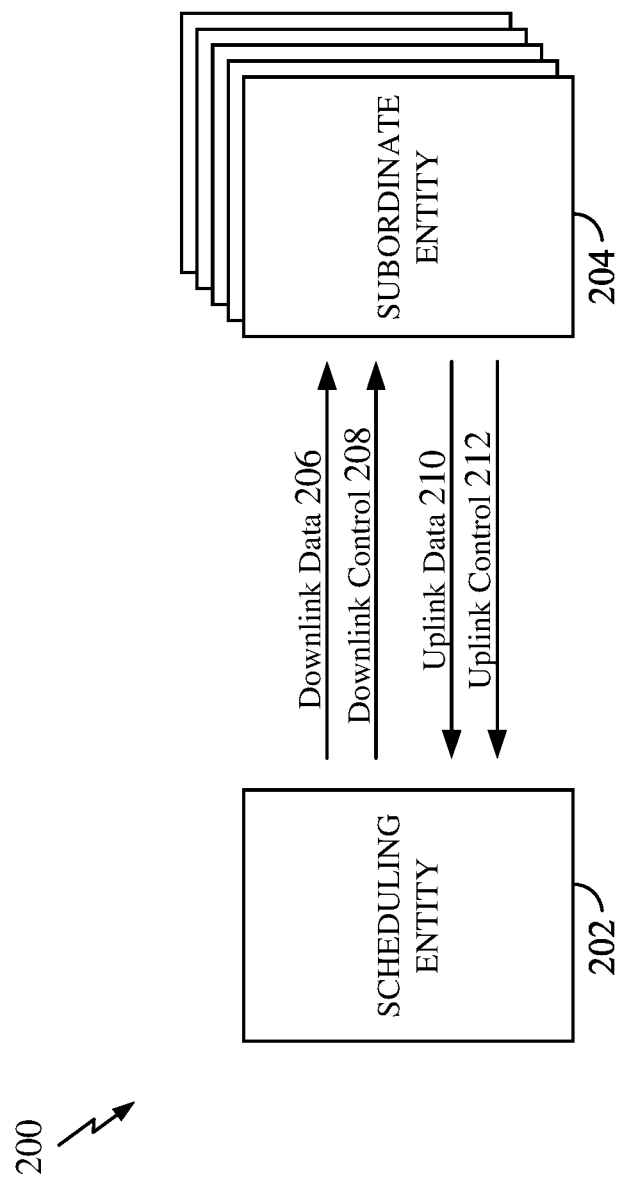
FIG. 2 is a block diagram conceptually illustrating an example of a scheduling entity communicating with one or more subordinate entities according to some aspects of the disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). The broadcasted data for each user may be exclusive and different by using a multiplexing scheme. Some examples of multiplexing schemes are frequency division multiplexing (FDM), time division multiplexing (TDM), spatial multiplexing, and multi-user multiple-input and multiple-output (MU-MIMO). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, a number of TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

In some aspects of the disclosure, the downlink control 208 and downlink data 206 may be transmitted in a downlink (DL) self-contained subframe utilizing a time-division duplexing (TDD) carrier. Similarly, the uplink data 210 and uplink control 212 may be transmitted in an uplink (UL) self-contained subframe in a TDD carrier. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
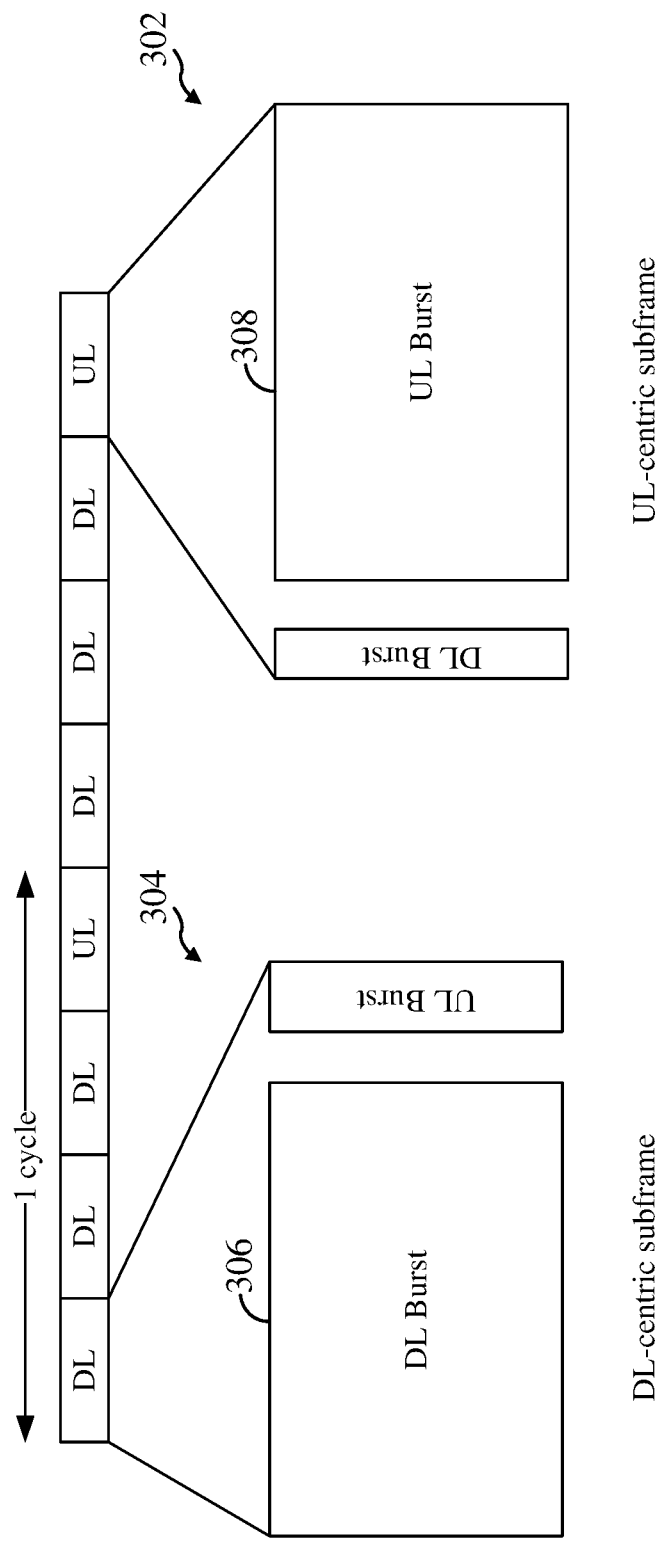
FIGS. 3 and 4 are diagrams illustrating examples of an uplink-centric subframe structure and a downlink-centric subframe structure according to some aspects of the disclosure.

As illustrated in FIG. 3, when utilizing a TDD carrier, communication may in some examples be organized by dividing the channel in the time domain into frames, with frames being further divided into subframes. According to an aspect of the present disclosure, subframes may take at least two general forms, referred to herein as an UL-centric subframe structure 302 and a DL-centric subframe structure 304. Here, a DL-centric subframe is a subframe where a majority of its time is used for communication in the downlink direction (e.g., shown as a DL burst 306 in FIG. 3); and an UL-centric subframe is a subframe where a majority of its time is used for communication in the uplink direction (e.g., shown as an UL burst 308 in FIG. 3).

In a typical cell deployment, there may be an asymmetry between downlink traffic and uplink traffic. In general, a network has a greater amount of downlink traffic, and accordingly, a greater number of DL-centric subframes may appear. Furthermore, even while this imbalance may be predictable, the actual ratio between UL-centric subframes and DL-centric subframes may not be predictable, and may vary over time. In the example of FIG. 3, the ratio is three DL-centric subframes to one UL-centric subframe for a certain cycle. However, other ratios are possible.

This combination of an imbalance, and unpredictability of its exact measure, can cause issues in conventional TDD frame/subframe structures. Specifically, if a UE or subordinate entity has data that it wishes to transmit over the uplink, the UE must wait for an uplink transmission opportunity. With this subframe structure, the time when such an uplink transmission opportunity may occur can vary, and can be unpredictable. In many cases, the time may be quite long, resulting in significant latency. This latency can be particularly problematic when the information that the UE wishes to transmit over the uplink is control feedback, which can in many cases be time-sensitive or mission-critical.

This unpredictable latency can be at least partially alleviated by utilizing a subframe structure that presents reasonable uplink transmission opportunities in every subframe. Accordingly, in some aspects of the present disclosure, TDD subframes may be structured as self-contained subframes.

Figure 4:
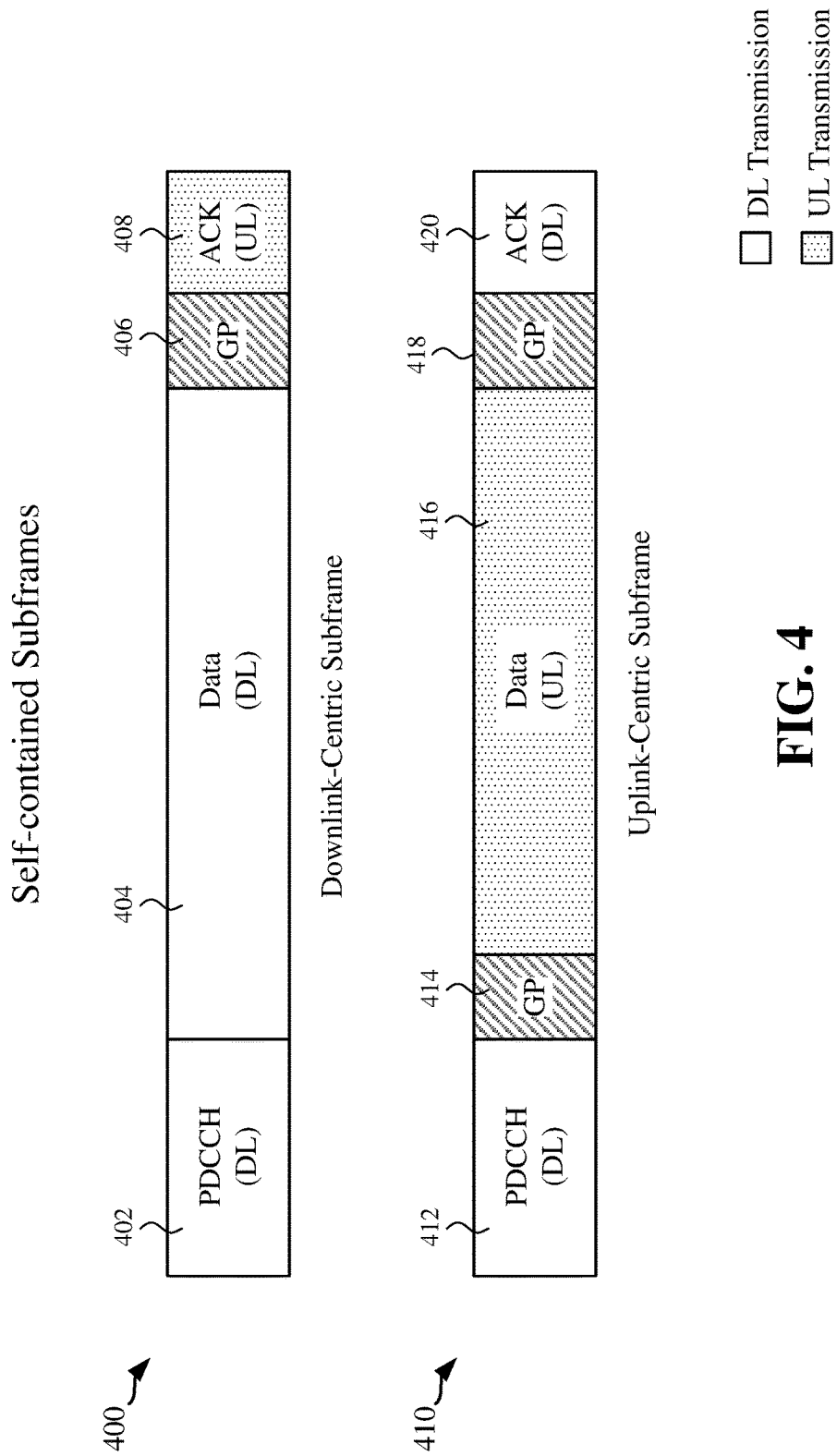

FIG. 4 illustrates exemplary structures of self-contained subframes 400 and 410. Broadly, a self-contained subframe is one in which the scheduling, the data transmission, and the data acknowledgment (feedback) are grouped together into a single self-contained unit or subframe, and may be independent of any other subframes. For example, referring to the DL-centric subframe 400, all of the data in the DL data portion 404 may be scheduled utilizing scheduling information or grants in the DL control region 402; and further, all of the data in the data portion 404 may be acknowledged (or negatively acknowledged) in the ACK portion 408 (UL control). Similarly, for the uplink-centric subframe 410, all of the data in the data portion 416 may be scheduled utilizing scheduling information or grants in the DL control region 412; and further, all of the data in the UL data portion 416 may be acknowledged (or negatively acknowledged) in the ACK portion 420 (DL control).

In the context of a multiple access network, channel resources are generally scheduled, and each entity is synchronous in time. That is, each node utilizing the network coordinates its usage of the resources such that transmissions are only made during the allocated portion of the frame, and the time of each allocated portion is synchronized among the different nodes or network devices. One node acts as a scheduling entity, and one or more nodes may be subordinate entities. The scheduling entity may be a base station or access point, or a UE in a device-to-device (D2D), P2P, and/or mesh network. The scheduling entity manages the resources on the carrier and assigns resources to other users of the channel or carrier, including subordinate or scheduled entities, such as one or more UEs in a cellular network.

Each subframe is divided into transmit (Tx) and receive (Rx) portions. In the DL-centric subframe 400, the scheduling entity first has an opportunity to transmit control information in the DL control region 402, and then an opportunity to transmit data in the DL data portion 404. The Tx portions 402 and 404 carry DL bursts in this case. Following a guard period (GP) portion 406, the scheduling entity has an opportunity to receive an acknowledged (ACK)/not acknowledged (NACK) signal or feedback in the ACK/NACK portion 408 from other entities using the carrier. The ACK/NACK portion 408 carries an UL burst. This frame structure is downlink-centric, as more resources are allocated for transmissions in the downlink direction (e.g., transmissions from the scheduling entity).

In one example, the DL control region 402 may be used to transmit a physical downlink control channel (PDCCH), and the DL data portion 404 may be used to transmit a DL data payload or user data. Following the GP portion 406, the scheduling entity may receive an ACK signal (or a NACK signal) from the scheduled entity or subordinate entity during the ACK/NACK portion 408 to indicate whether the data payload was successfully received. The GP portion 406 may be scheduled to accommodate variability in UL and DL timing. For example, latencies due to RF antenna and/or circuitry direction switching (e.g., from DL to UL) and transmission path latencies may cause the subordinate entity to transmit early on the UL to match DL timing. Such early transmission may interfere with symbols received from the scheduling entity. Accordingly, the GP portion 406 may allow an amount of time after the DL data portion 404 to prevent or reduce interference, where the GP portion 406 may provide an appropriate amount of time for the scheduling entity to switch its RF antenna/circuitry direction, for the over-the-air (OTA) transmission time, and time for ACK processing by the subordinate entity. Accordingly, the GP portion 406 may provide an appropriate amount of time for the subordinate entity to switch its RF antenna/circuitry direction (e.g., from DL to UL), to process the data payload, and for the over-the-air (OTA) transmission time. The duration of the GP portion 406 may be configured in terms of symbol periods. For example, the GP portion 406 may have a duration of one symbol period or multiple symbol periods. This frame structure is downlink-centric, as more resources are allocated for transmissions in the downlink direction (e.g., transmissions from the scheduling entity).

In the UL-centric subframe 410, the subordinate entity first has an opportunity to receive control information in the DL control region 412. Following a GP portion 414, the subordinate entity has an opportunity to transmit data in the UL data portion 416. Following another GP portion 418, the subordinate entity subsequently has an opportunity to receive an ACK/NACK signal in the ACK/NACK portion 420 (DL portion) from the scheduling entity using the carrier. This frame structure is uplink-centric, as more resources are allocated for transmissions in the uplink direction (e.g., transmissions from the subordinate entity). In some aspects of the disclosure, the GP portions may be optional.

In some aspects of the present disclosure, certain control information such as some of that carried within the DL control information (DCI) in an LTE network may be pulled or grouped into its own physical channel: the physical downlink retransmission indicator channel (PDRICH). The PDRICH may include a subset of information carried in a control subband or control region of a subframe. For example, if the DCI in a subframe is broken up such that resource allocation may be provided first in a subframe, and later in the subframe, retransmission indicators (RI) may be provided in the PDRICH, then the scheduling entity has additional time to determine whether to perform a retransmission. By virtue of a suitable subframe structure, including the location of the PDRICH, single-interlace transmissions may be enabled.

Figure 5:
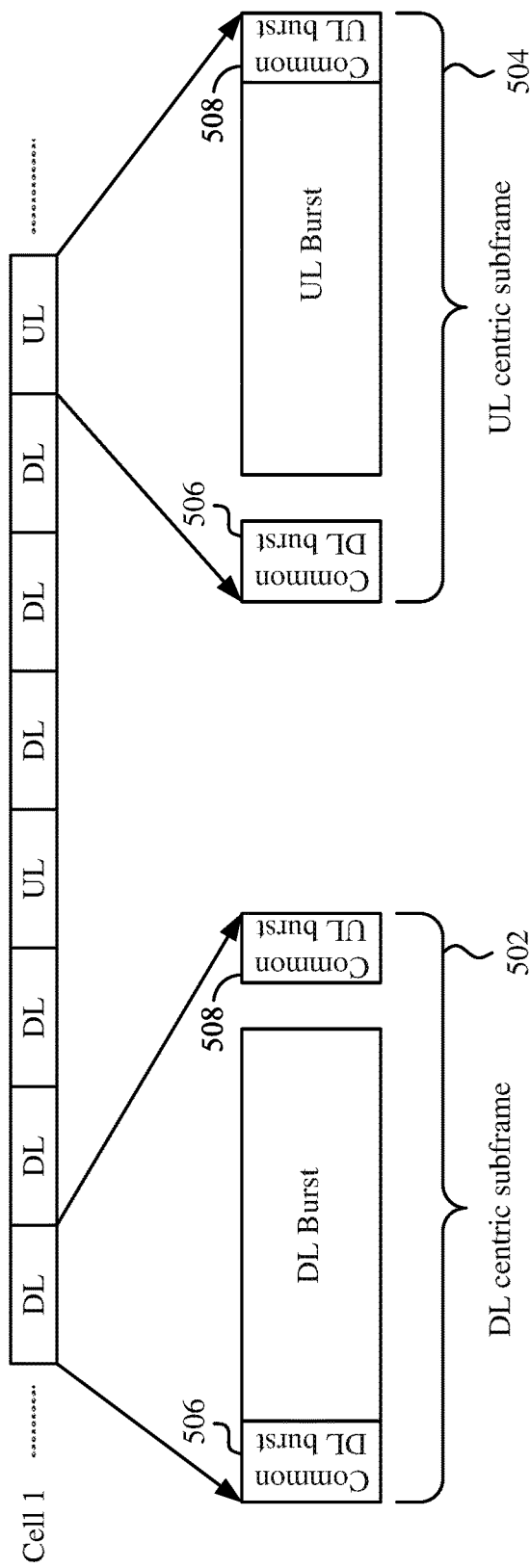
FIG. 5 is a diagram illustrating a common downlink (DL) burst and a common uplink (UL) burst included in each of a DL-centric subframe and an UL-centric subframe.

FIG. 5 is a schematic diagram illustrating some examples of common DL bursts and common UL bursts as they may appear in each of a DL-centric subframe 502 and an UL-centric subframe 504. In the illustrated examples, the common DL bursts 506 occur at the beginning of each subframe, and the common UL bursts 508 occur at the end of each subframe. However, this is not necessarily the case, and within the scope of the present disclosure, such common UL burst and common DL burst may appear anywhere within each respective subframe.

In some aspects of the disclosure, all common DL bursts 506 within any given subframe (whether an UL-centric subframe or a DL-centric subframe) may be structured the same; and similarly, all common UL bursts 508 within any given subframe (whether an UL-centric subframe or a DL-centric subframe) may be structured the same.

While these common bursts may carry any suitable information, in some examples, the common DL burst may be utilized to carry control information transmitted by the scheduling entity, including but not limited to scheduling information for either the UL or DL (or both); or, in multi-interlace or non-self-contained subframes, physical layer acknowledgment (ACK) transmissions. For example, the common DL bursts 506 may include the DL control regions 402 and 412 of FIG. 4. Further, the common UL burst may be utilized to carry UL control information transmitted by the UE or subordinate entity, including but not limited to a sounding reference signal (SRS), a physical layer ACK or NACK, a scheduling request (SR), channel quality information (CQI), etc.

As with the self-contained subframes described above, by utilizing these common UL and DL bursts, latency may be reduced for mission-critical packets such as control information and feedback, to the duration of, for example, a single subframe. However, according to various aspects of the present disclosure, the possibility for this latency or delay to be controlled allows different delays or latencies to be provided. That is, by virtue of the presence of the common DL burst 506 and common UL burst 508 in every subframe, the subordinate entity and scheduling entity may be enabled to send the control information carried on these common bursts with a configurable delay, which may be independent of the UL/DL ratio, or the nature of the particular subframe currently occupying the channel (either DL-centric or UL-centric). Furthermore, in further aspects of the disclosure, UEs or subordinate entities with different delays may be multiplexed onto the channel, and may share these resources while still maintaining control over their respective delays.

Figure 6:
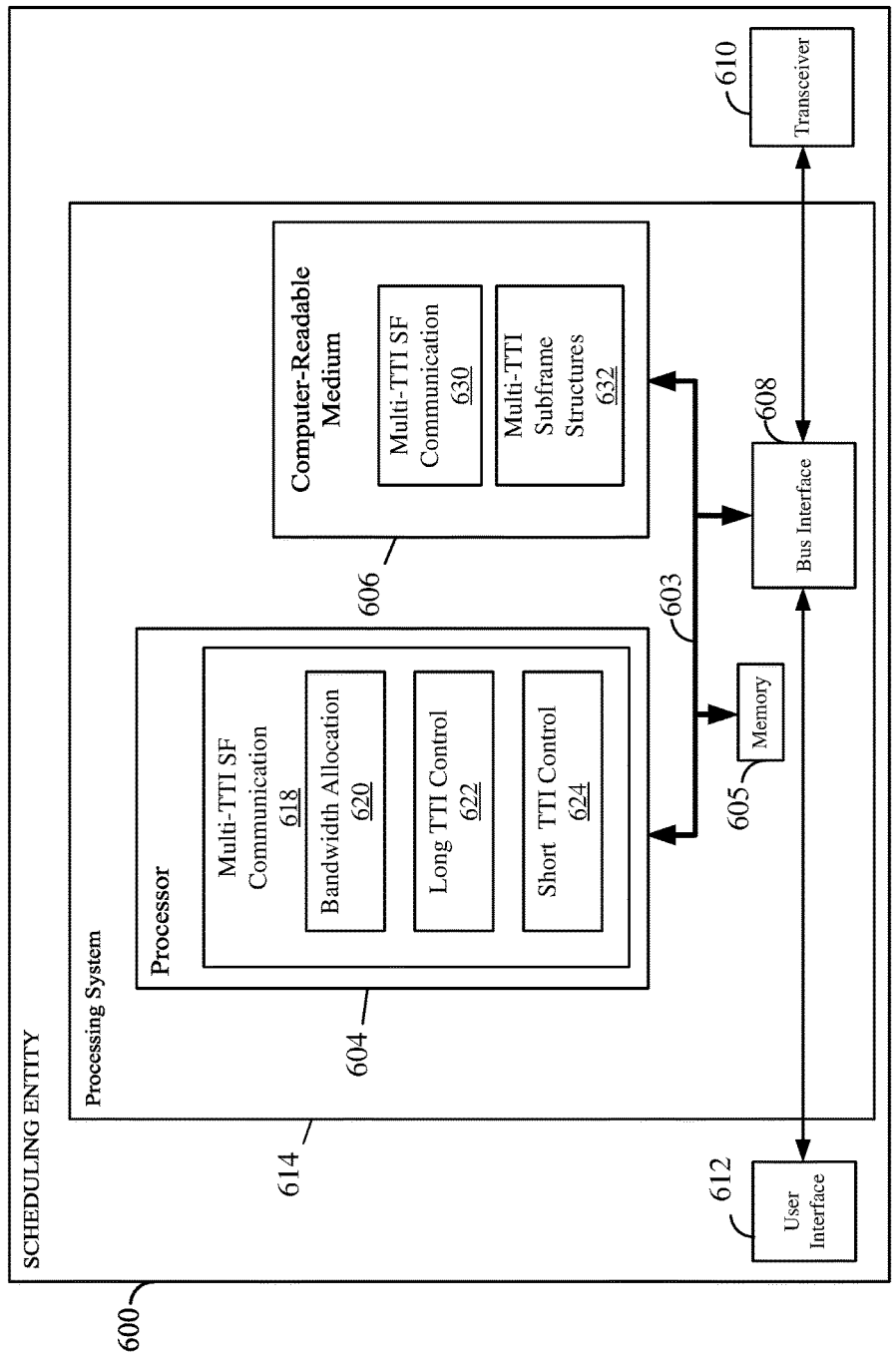
FIG. 6 is a block diagram illustrating an example of a hardware implementation for a scheduling entity employing a processing system according to one aspect of the disclosure.

FIG. 6 is a simplified block diagram illustrating an example of a hardware implementation for a scheduling entity 600 employing a processing system 614. For example, the scheduling entity 600 may be a user equipment (UE) as illustrated in any one or more of FIGS. 1 and/or 2. In another example, the scheduling entity 600 may be a base station as illustrated in any one or more of FIGS. 1 and/or 2.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions and processes described herein. That is, the processor 604, as utilized in a scheduling entity 600, may be used to implement any one or more of the processes and functions utilizing the subframe structures described below and illustrated in FIGS. 8-19.

In some aspects of the disclosure, the processor 604 may include a multi-TTI subframe communication block 618 that may be configured to perform the communication functions and processes described in FIGS. 8-19. In one example, the multi-TTI communication block 618 may include a bandwidth allocation block 620, a long TTI control block 622, and a short TTI control block 624.

Figure 12:
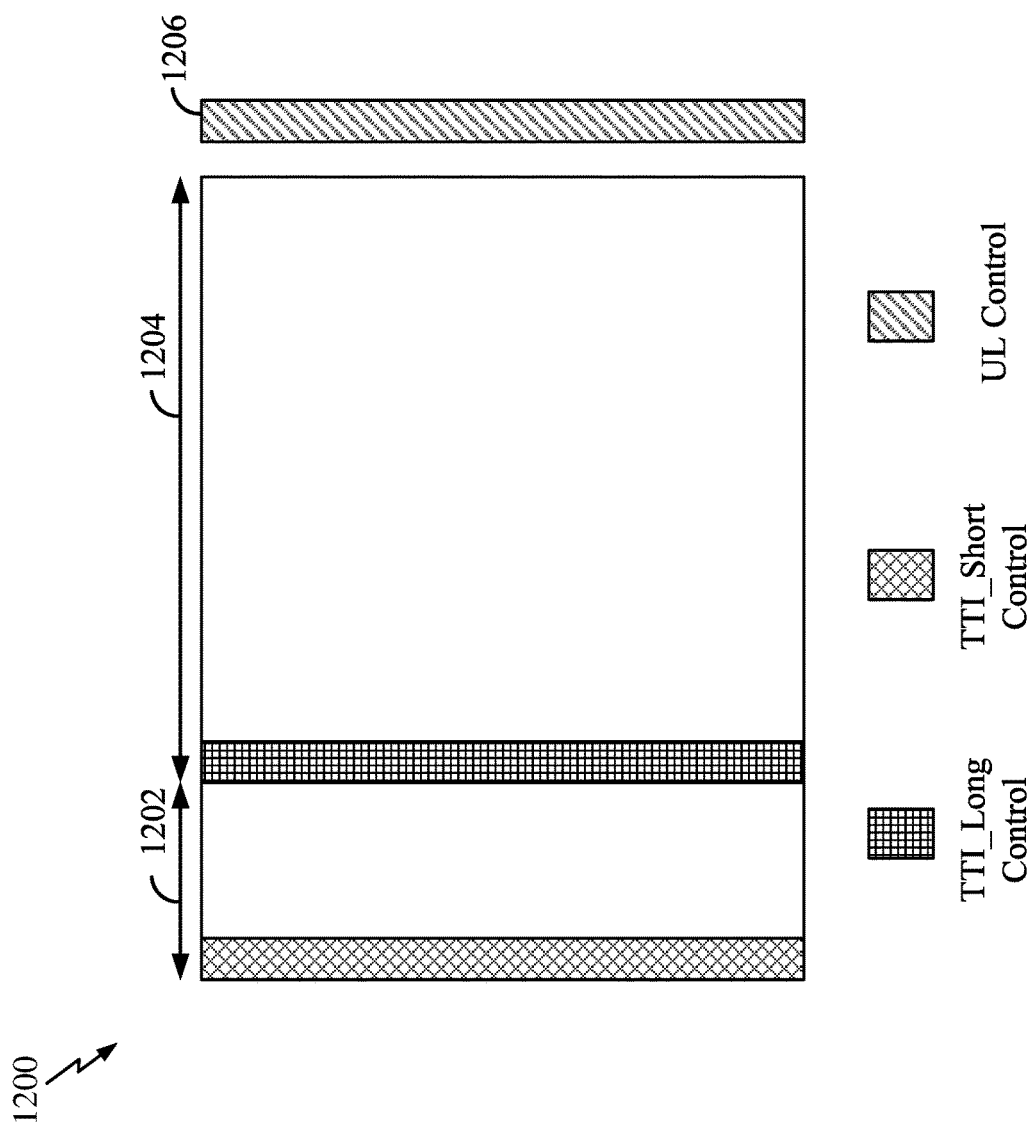
FIG. 12 is a diagram illustrating an example of a two-TTI subframe structure including a short TTI at the front followed by a long TTI according to an aspect of the disclosure.
Figure 13:
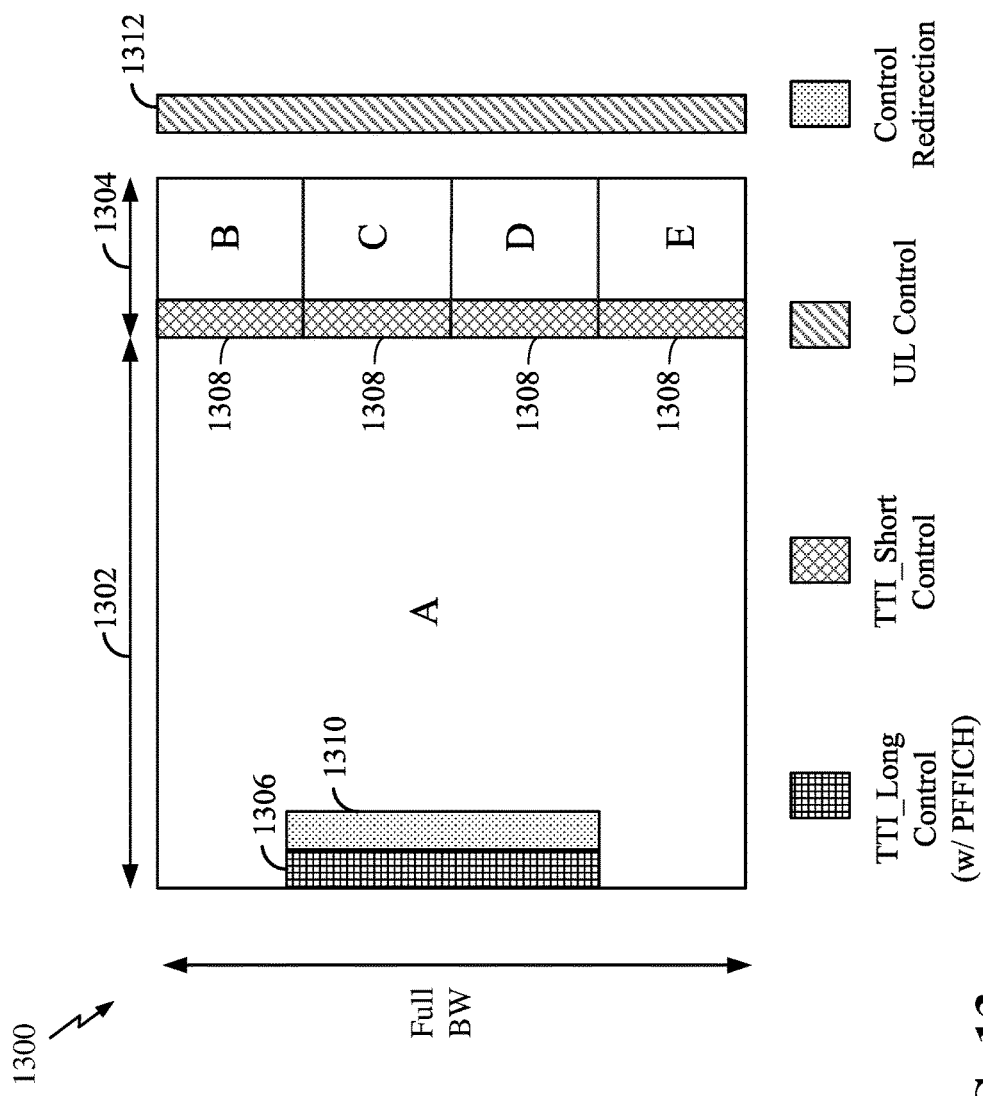
FIG. 13 is a diagram illustrating an example of a two-TTI subframe structure with subbanding in a short TTI according to one aspect of the disclosure.
Figure 14:
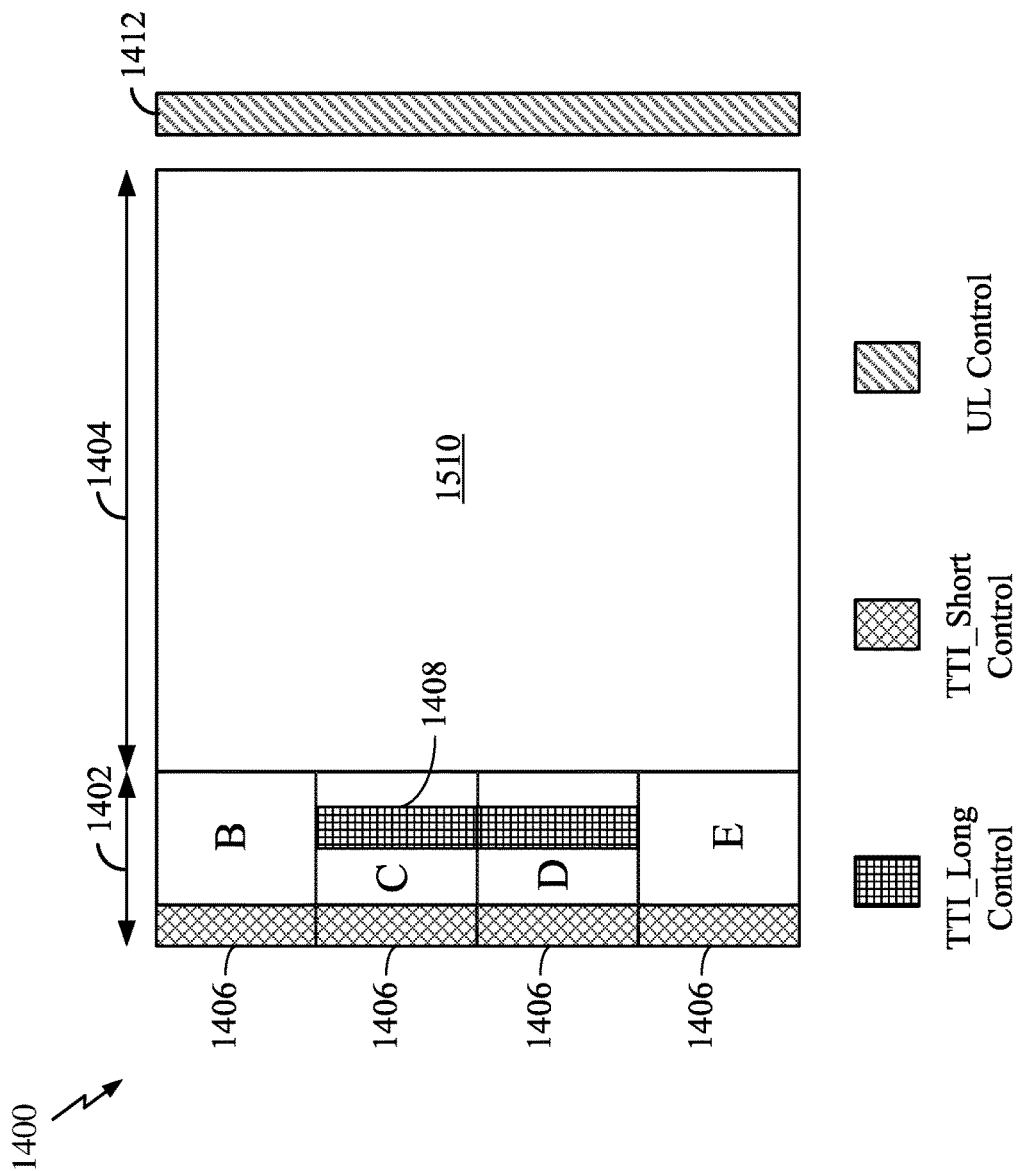
FIG. 14 is a diagram illustrating an example of a two-TTI subframe structure with subbanding in a short TTI at the front of a subframe according to an aspect of the disclosure.
Figure 15:
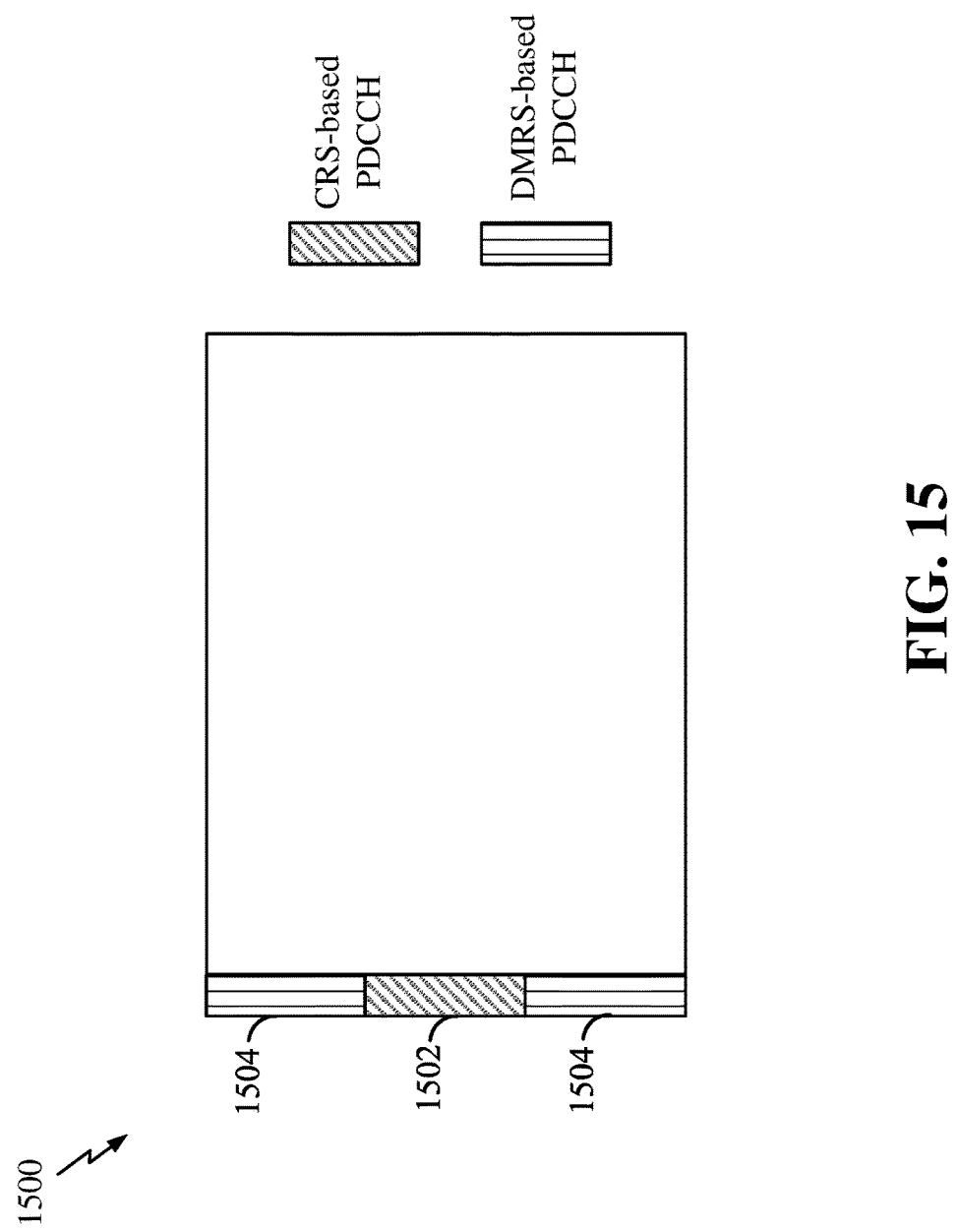
FIG. 15 is a diagram illustrating an example of a subframe structure with control channels based on different reference signals according to an aspect of the disclosure.

The bandwidth allocation block 620 may be utilized to allocate various bandwidths or subbands to the subordinate entities, for example, as illustrated in FIGS. 13-15. A large data user may be allocated a wider bandwidth, while a small data user may be allocated a narrower bandwidth. The bandwidth allocation block 620 may also allocate a control subband that may be narrower than the available bandwidth. The long TTI control block 622 may be configured to perform various control and data communication functions using a long TTI of a multi-TTI subframe as described in relation to FIGS. 8-19. The short TTI control block 624 may be configured to perform various control and data communication functions using a short TTI of a multi-TTI subframe as described in relation to FIGS. 8-19.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

The computer-readable medium 606 may be stored with a multi-TTI subframe communication code 630 that may be executed by the processor 604 to perform various communication functions and processes as described in relation to FIGS. 8-19. For example, the processor 604 when executing the multi-TTI subframe communication code 630 may utilize a plurality of multi-TTI subframe structures 632 to communicate with one or more subordinate entities as illustrated in FIGS. 8-19.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614 and a network storage. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 7:
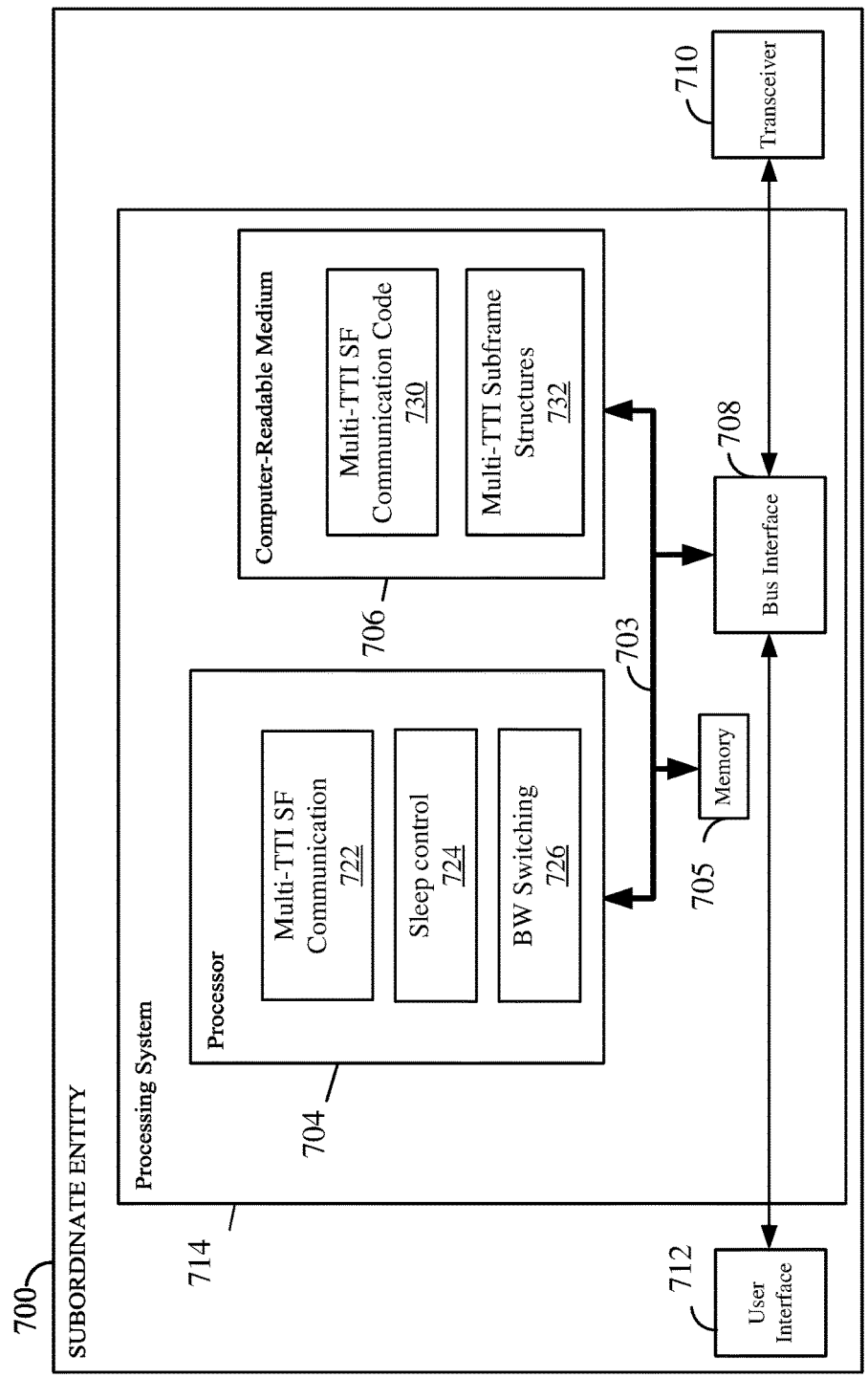
FIG. 7 is a block diagram illustrating an example of a hardware implementation for a subordinate entity employing a processing system according to one aspect of the disclosure.

FIG. 7 is a conceptual diagram illustrating an example of a hardware implementation for an exemplary subordinate entity 700 employing a processing system 714. In accordance with various aspects of the disclosure, an element, or any portion of an element, or any combination of elements may be implemented with a processing system 714 that includes one or more processors 704. For example, the subordinate entity 700 may be a user equipment (UE) as illustrated in any one or more of FIGS. 1 and/or 2.

The processing system 714 may be substantially the same as the processing system 614 illustrated in FIG. 6, including a bus interface 708, a bus 702, memory 705, a processor 704, and a computer-readable medium 706. Furthermore, the subordinate entity 700 may include a user interface 712 and a transceiver 710 substantially similar to those described above in FIG. 6. That is, the processor 704, as utilized in a subordinate entity 700, may be used to implement any one or more of the processes utilizing the subframe structures described below and illustrated in FIGS. 8-19.

In some aspects of the disclosure, the processor 704 may include a multi-TTI subframe communication block 722 that may be configured to perform the communication functions and processes described in FIGS. 8-19 using multi-TTI subframes. The processor 704 may include a sleep control block 724 that may be configured to enable and disable a sleep mode. When the sleep mode is enabled, the subordinate entity 700 may reduce its power consumption by disabling or turning off some of its circuitry and components that is not needed. The processor 704 may include a bandwidth (BW) switching block 726 that may be configured to reconfigure the subordinate entity 700 to utilize a certain bandwidth or subband assigned by a scheduling entity. In some examples, the bandwidth switching block 726 may be utilized to switch the subordinate entity to different bandwidths or subbands to access a control channel that may be narrower than the available bandwidth of the subframe.

The computer-readable medium 706 may be stored with a multi-TTI subframe communication code 730 that may be executed by the processor 704 to perform various communication functions and processes as described in relation to FIGS. 8-19. For example, the processor 704 when executing the multi-TTI subframe communication code 730 may utilize a plurality of multi-TTI subframe structures 732 to communicate with a scheduling entity as described in relation to FIGS. 8-19.

As described above in relation to FIG. 5, in a self-contained subframe, the ACK/NACK for DL data is sent back on the UL to the base station or scheduling entity at the end of the same subframe. While this scheme has many network side benefits, it is demanding on the UE and for some particular scenarios (e.g., high Doppler), it may be costly in terms of UE processing horsepower and power consumption to meet the self-contained subframe requirement. Alternatively, forgoing self-containedness (i.e., sending ACK/NACK in a next subframe) may relax UE processing at the cost of more interlaces and higher latency.

In some aspects of the disclosure, a flexible and configurable subframe structure may include multiple TTIs (2 or more TTIs) to interleave or multiplex users with different throughput/latency requirements and/or capabilities so as to relax the processing requirements while still meeting the self-containedness of the self-contained subframe. In some aspects of the disclosure, subbanding may be used to further optimize bandwidth (BW) granularity and allow power saving with dynamic BW switching and adaptation with very little air interface overhead. Subbanding is the division or partition of the available channel BW into multiple BW regions or subbands that may be assigned to different users or devices. Subbanding may also be used for a control region of the subframe so that a device without the full BW capability can still access the control region.

Figure 8:
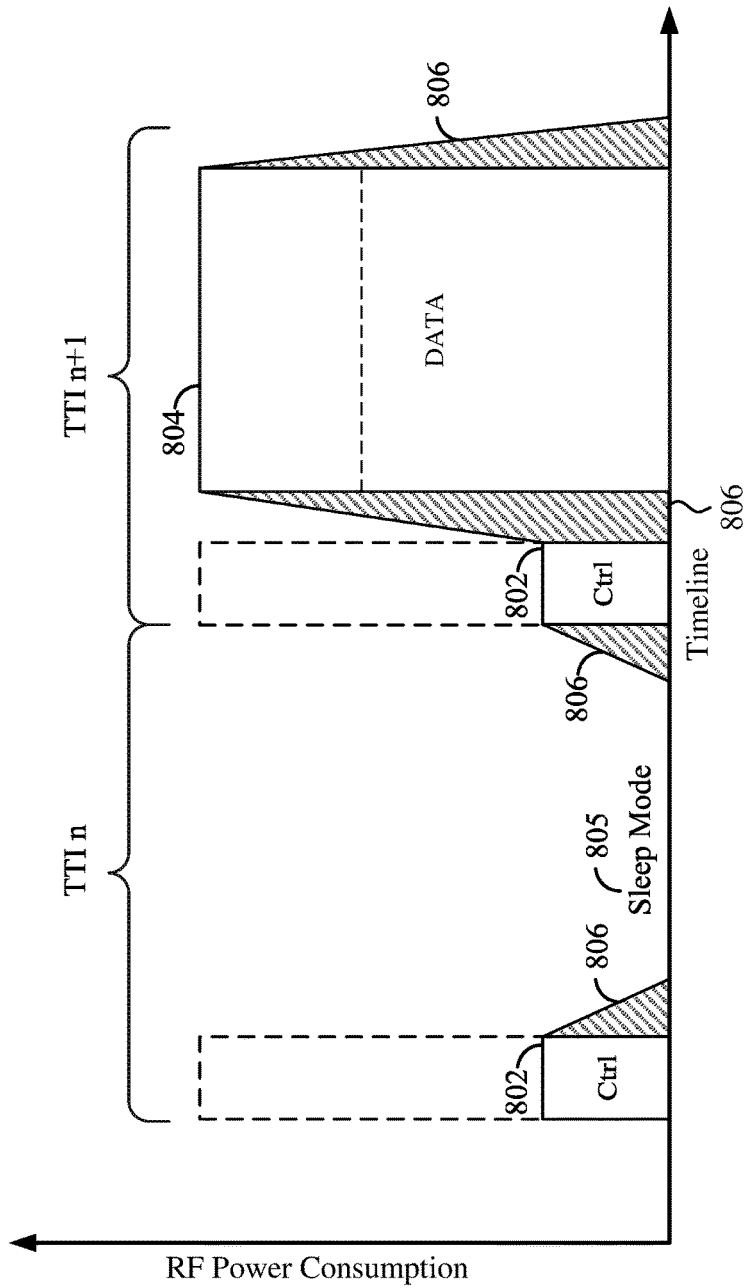
FIG. 8 is a diagram illustrating dynamic bandwidth switching for multiplexing DL control and data communication according to one aspect of the disclosure.

FIG. 8 is a conceptual diagram illustrating dynamic bandwidth switching for multiplexing DL control and data communication in accordance with an aspect of the disclosure. In FIG. 8, the areas represent the energy consumed for transmitting control symbols and data (payload) symbols respectively. The control symbols 802 are transmitted utilizing a narrower bandwidth than that of the data symbols 804. To receive the control symbols 802, a subordinate entity (e.g., UE) may configure its radio frequency (RF) resources or circuitry (e.g., transceiver 710) to use a narrower bandwidth that is sufficient to cover the resource blocks (RBs) or subbands allocated by a scheduling entity (e.g., base station), instead of always tuning to the full system bandwidth. In some examples, the subordinate entity may be configured to use dynamic bandwidth switching for multiplexing UL control and data symbols. Using this dynamic bandwidth switching scheme may provide significant power saving for the scheduling entity and/or subordinate entity. In some examples, narrower bandwidth may operate with lower sampling rate and consume less power than higher sampling rate used for wider bandwidth. In some aspects of the disclosure, the subordinate entity may enter a sleep mode (microsleep) 805 to save power, for example, when there is no user data to transmit/receive in a certain TTI.

The switching time 806, either between the narrower bandwidth and wider bandwidth or transitioning into/out of a sleep mode, may be quantized to be an integer number of symbols so as to facilitate timing alignments. In some examples, the overall frame timing may be kept consistent or the same, but the time duration of the control and data regions will be reduced to accommodate the switching/transition time 806. However, dynamic BW switching may reduce spectral efficiency due to the switching time 806. In some aspects of the disclosure, the network may control the number of subordinate entities that may use dynamic bandwidth switching to control the overall spectral efficiency of the network. For example, only subordinate entities that are in a power saving mode may utilize dynamic bandwidth switching, and the network may control how many subordinate entities may be in the power saving mode.

Figure 9:
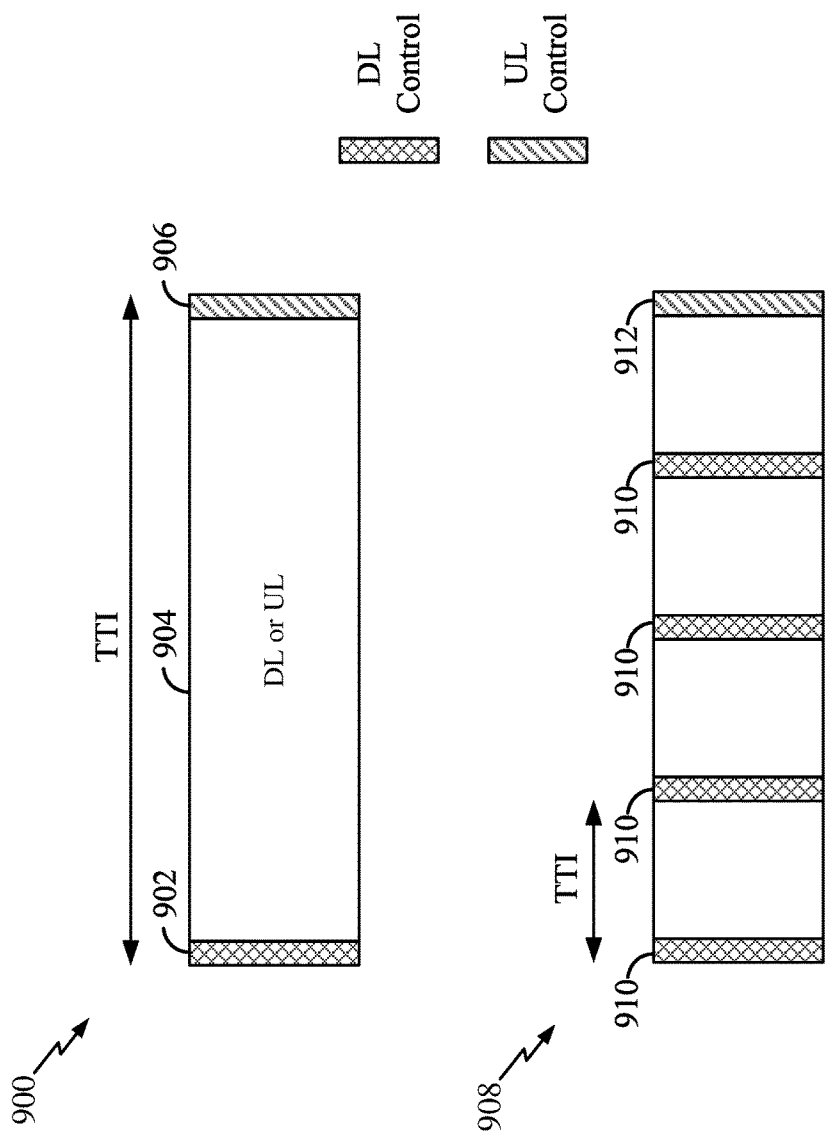
FIG. 9 is a diagram illustrating an example of a multi-TTI subframe structure according to one aspect of the disclosure.

FIG. 9 is a conceptual diagram illustrating a multi-TTI subframe structure in accordance with an aspect of the disclosure. For comparison, the top subframe is a single TTI subframe 900 including a DL burst 902, a data portion 904, and an UL burst 906. The DL burst 902 and UL burst 906 may be used for transmitting control information and/or feedback information (e.g., ACK/NACK). A multi-TTI subframe 908 extends over multiple TTIs (four exemplary TTIs shown in FIG. 9). A multi-TTI subframe may include at least one DL TTI and at least one UL TTI. A DL multi-TTI subframe is one that a majority of its duration is for DL transmission, while a UL multi-TTI subframe is one that a majority of its duration is for UL transmission. In this example, each of the TTIs has a DL burst 910, and the entire subframe has a single UL burst 912 at the end of the subframe 908. This multi-TTI subframe structure may be self-contained and implemented as a TDD subframe, a frequency division duplexing (FDD) subframe, or a HD-FDD (hybrid frequency division duplexing) subframe.

Figure 10:
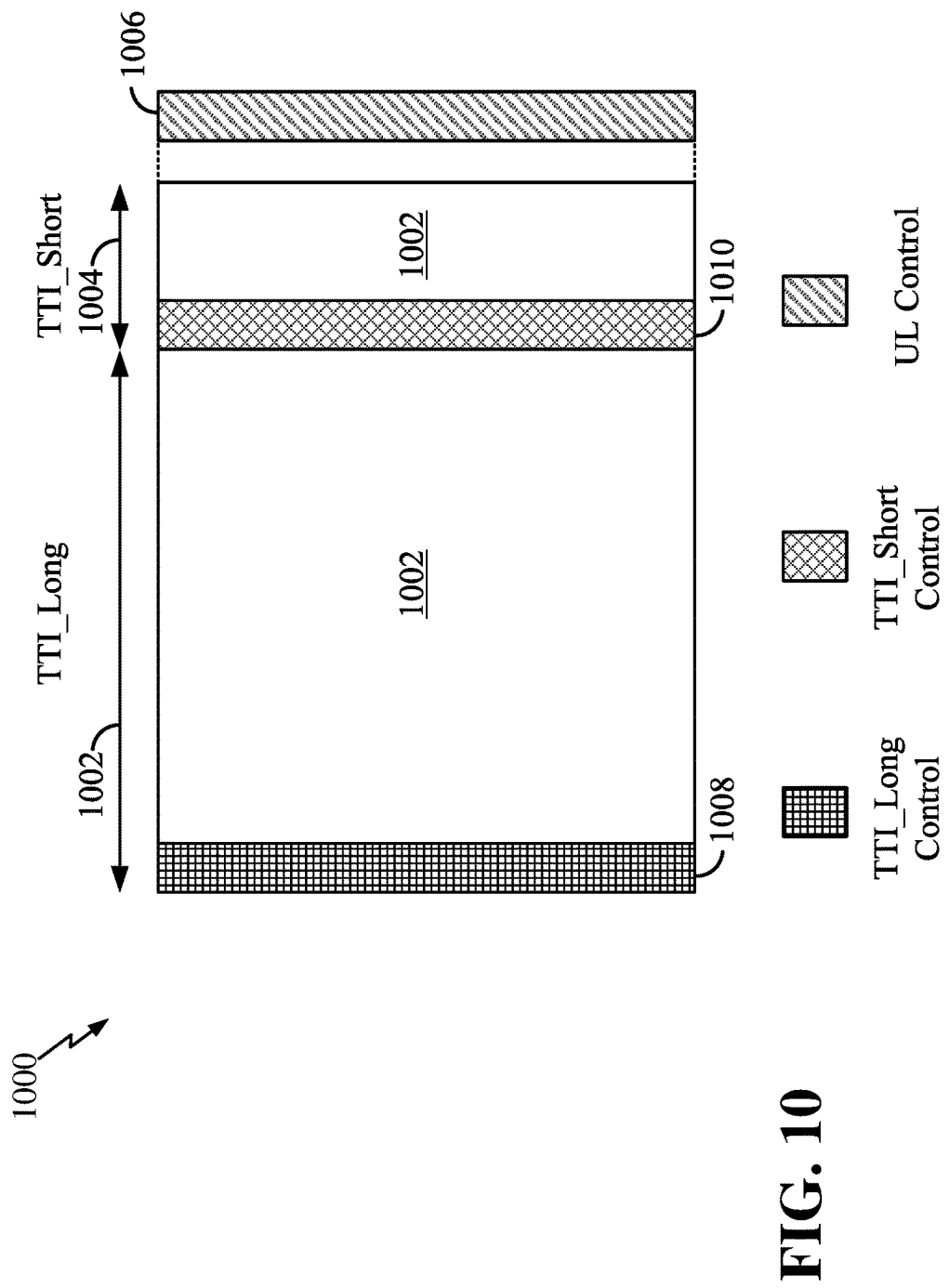
FIG. 10 is a diagram illustrating an example of a two-TTI subframe structure including a short TTI followed by a long TTI according to one aspect of the disclosure.

FIG. 10 is a diagram illustrating a multi-TTI subframe structure 1000 including a long TTI 1002 and a short TTI 1004 in accordance with one aspect of the disclosure. In this example, the long TTI 1002 (first TTI) is at the front of the subframe 1000, followed by the short TTI 1004 (second TTI) and a UL control burst 1006. In one aspect of the disclosure, a subordinate entity (e.g., UE) may be assigned to either the long TTI 1002 or short TTI 1004. The long TTI 1002 includes a DL control region 1008, and the short TTI 1004 also includes a DL control region 1010. In general, the long TTI is more suited to large data users, while the short TTI is for small data users. In some aspects of the disclosure, the durations of the long TTI 1002 and short TTI 1004 may be different or the same. In some examples, the long TTI 1002 may have a longer duration than the short TTI 1004. In some other examples, the long TTI 1002 may have a shorter duration than the short TTI 1004. A large data user or subordinate entity transmits more data than that of the small data user in a subframe. Some examples of small data users are IoT devices and remote sensors. In one example, the long TTI control region 1008 may carry reference signals (e.g., pilots and cell-specific reference signals (CRS)) and a PDCCH interleaved with the CRS in the first symbol, and PDRICH in the second symbol. The reference signals (e.g., CRS) may be located at the front (e.g., the first symbol) of the subframe structure 1000 to facilitate power saving using microsleep and/or dynamic bandwidth switching.

The PDRICH may utilize the same modulation and coding as that of the PDCCH. The PDRICH may be located in the second symbol to provide the scheduling entity with some time to process any ACK/NACK received at the end of a previous subframe. With this subframe structure, the scheduling entity has about one symbol time to make the decision, in accordance with the received ACK/NACK, whether to signal within the PDRICH that the data information carried on this subframe will be a new transmission or a retransmission by utilizing a retransmission indicator (RI). Putting the PDRICH in the long TTI control region 1008 allows the subframe structure 1000 to be used as a single-interlace subframe.

In this subframe structure 1000, the short TTI 1004 acts like a time gap between the long TTI 1002 and the UL control burst 1006. Therefore, the short TTI 1004 can extend the processing timeline (e.g., deadline) of a long TTI user that needs to transmit control information (e.g., ACK/NACK) or other UL information in the UL control burst 1006. This subframe structure 1000 may facilitate deeper pipelining and higher hardware utilization of the long TTI users. It is also possible for a long TTI user to put its RF resources or circuitry into sleep mode during the short TTI 1004 to conserve more power. In some aspects of the disclosure, this subframe structure 1000 may facilitate non-causal processing within the same subframe for a long TTI user because the short TTI period allows a more relaxed processing timeline for a long TTI user so that more symbols could be buffered, and data symbol processing could be delayed to take advantage of subsequent reference symbols that may become available for more accurate channel estimation. Non-causal processing in this example can improve data demodulation performance under high Doppler scenarios. In other words, non-causal processing of the long TTI data symbols can become more practical to implement because the processing time can be extended into the short TTI period before the UL control burst 1006 is due.

For short TTI users, the processing requirement of the communication may be significantly less than the device's capability. Therefore, a short TTI user can complete the processing of the communication (e.g., receiving, decoding, demodulation, etc.) and still meet the timeline or deadline to generate and transmit a corresponding response (e.g., ACK/NACK) in the UL control burst 1006.

Figure 11:
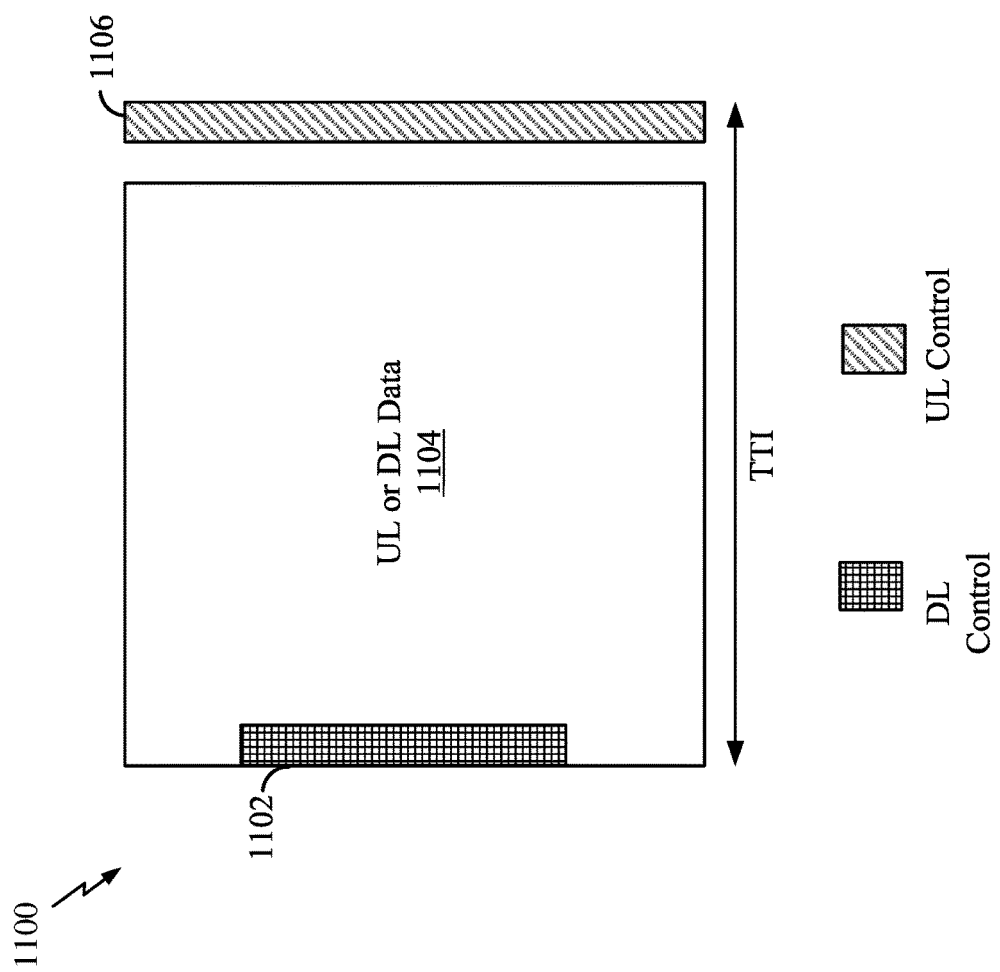
FIG. 11 is a diagram illustrating an example of a subframe structure including a subbanded control region according to one aspect of the disclosure.

FIG. 11 is a diagram illustrating a subframe structure 1100 including a subbanded control region 1102 and a data region 1104 in accordance with an aspect of the disclosure. In some examples, the subframe structure 1100 may be utilized by devices with higher data rate and/or low Doppler effect or shift. In this subframe structure 1100, the control region 1102 is allocated a portion of the full bandwidth (i.e., subbanded), while the data region 1104 (UL or DL) is allocated a larger bandwidth (e.g., a full bandwidth). The control region 1102 may include reference signals (e.g., pilots or CRS) that are located at the front of the subframe to facilitate power saving using microsleep and/or dynamic bandwidth switching. The subbanding of the control region 1102 can facilitate power saving because the subordinate entities need not support and monitor a large or full bandwidth. The subframe 1100 may be utilized by a user or UE that has sufficient processing power to meet the processing timeline or deadline (e.g., within a single TTI) to generate and transmit control information (e.g., ACK/NACK) in the UL control burst 1106 at the end of the subframe 1100. The UL control burst 1106 and the data region 1104 may be separated by a guard period.

FIG. 12 is a diagram illustrating a two-TTI subframe structure 1200 including a short TTI 1202 at the front followed by a long TTI 1204 and an UL control burst 1206 in accordance with an aspect of the disclosure. The two-TTI subframe structure 1200 is similar to the two-TTI subframe structure 1000, but the relative positions of the long TTI 1204 and short TTI 1202 are reversed. Therefore, redundant description of the two-TTI subframe structure 1200 will be omitted. In other aspects of the disclosure, a configurable subframe of the present disclosure may have more than two TTIs and various combinations of long TTI and short TTI within the same subframe. In one aspect of the disclosure, a subordinate entity (e.g., UE) may be assigned to either the long TTI 1204 or short TTI 1202. In general, the long TTI is more suited to large data users, while the short TTI is for small data users. The control region of the short TTI 1202 may include reference signals (e.g., pilots or CRS) that are located at the front (e.g., first symbol) of the subframe 1200 to facilitate power saving using microsleep and/or dynamic bandwidth switching.

FIG. 13 is a diagram illustrating a two-TTI subframe structure 1300 with subbanding in a short TTI in accordance with an aspect of the disclosure. The subframe 1300 has a long TTI 1302 at the front followed by a short TTI 1304 and an UL control burst 1312. In this example, a user of the long TTI 1302 may be allocated a wide subband (e.g., bandwidth A) or the entire system bandwidth. Within the long TTI 1302, the scheduling entity may multiplex payload data (e.g., a Physical Downlink Shared Channel (PDSCH)) with control information. In one example, the control region 1306 of the long TTI 1302 may be located at the front of the subframe. The control region 1306 may front-load the reference signals (e.g., CRS) to facilitate power saving using microsleep and/or dynamic bandwidth switching. Front-loading the reference signals make these signals available in the first symbol of the subframe. Therefore, all devices including long and short TTI users can receive their control information early from the control region 1306.

In some aspects of the disclosure, the long TTI control region 1306 may be allocated a narrower bandwidth or subband, or may be partitioned into multiple subbands with narrower bandwidth, so that all types of devices including devices not capable of accessing the full bandwidth may receive their control information available in a control subband within 1306. In some examples, a particular or default control subband may be called an anchor control subband and may have the same frequency/band in each subframe such that a subordinate entity will know where to look for the control channel. This subframe structure 1300 allows time-critical control information (e.g., reference signals and CRS) to be provided at the beginning of the subframe to improve the processing timeline. Because both long TTI users and short TTI users may receive certain control information in the control subband 1306 at the front of the subframe 1300, the short TTI users may have extra time to prepare for the short TTI 1304. For example, a short TTI user may determine its assigned subband in the short TTI from the control subband 1306.

In this example, the short TTI 1304 is partitioned into four subbands (e.g., subbands B, C, D, and E). The subbands have separate control regions 1308. Subbanding the short TTI 1304 allows multiplexing accesses by devices capable of communicating over a smaller bandwidth (e.g., subbands B, C, D, and E). In some examples, a user may be assigned more than one subband if needed/supported. In some examples, a short TTI user may be dynamically assigned different subband(s) in different TTIs. In some aspects of the disclosure, a short TTI user may receive the subband assignment information from a control redirection region 1310 in the long TTI following the control burst 1306. The control redirection region 1310 may be located at an anchor control subband that is located in a predetermined known subband. After receiving the control information, the short TTI user may retune or reconfigure its RF circuitry to the assigned subband(s) in the following short TTI 1304.

With this subframe structure, a subordinate entity can learn about its scheduling or data assignment (e.g., corresponding PDSCH data) at the beginning of the subframe (e.g., control burst 1306 and control redirection region 1310). When no data is assigned for the current subframe, the device may enter a sleep mode (e.g., microsleep) earlier to conserve power for the rest of the subframe. For a short TTI user, it can still conserve power in the sleep mode during the long TTI 1302, even when there is data assignment in the short TTI 1304.

In one example, the control region 1306 of the long TTI 1302 may include a Physical Frame Format Indicator Channel (PFFICH) for broadcasting or multi-casting the TTI configurations of the current subframe. For example, the TTI configuration may include a number of TTIs of the subframe, start and end timing of the TTIs, and/or subband configuration (if used). The PFFICH is located at the beginning of the subframe and its location is known (e.g., anchor subbands) to all users. Therefore, a blind search of the PFFICH may be reduced or avoided. The control region 1306 may also include reference signals (e.g., CRS) that are located at the front (e.g., first symbol) of the subframe to facilitate power saving using microsleep and/or dynamic bandwidth switching.

In one example, the DL control information (e.g., PFFICH) in the long TTI 1302 may convey the TTI location (e.g., long or short TTI and their timings) and resource block (RB) allocation for the short TTI users. In another example, the DL control information may convey the TTI location and subband assignment to the short TTI users, but not RB allocation. A short TTI user then tunes its RF circuitry to the assigned subband(s) (e.g., subbands B, C, D, and E) and receives the corresponding control channel 1308 of that subband to receive the DL control information to determine the actual RB allocation for that subband. Therefore, each subband may be self-contained.

In some aspects of the disclosure, semi-dynamic configuration may be used to assign TTI type. For example, a subordinate entity may be assigned to be in a long TTI or short TTI mode when it establishes a connection with a scheduling entity (e.g., a base station). The subordinate entity maintains this TTI mode assignment until it receives explicit control signaling from the scheduling entity to change its TTI mode before it receives a subframe with a different TTI mode. In some examples, the control signaling may be included in the downlink control information (DCI) carried in a physical layer control channel such as a Physical Downlink Control Channel (PDCCH).

In some aspects of the disclosure, semi-static configuration may be used to assign TTI type. For example, a subordinate entity may be predetermined or classified as a short TTI or long TTI user at the Radio Resource Control (RRC) level. RRC is a signaling protocol for control plane signaling between the scheduling entity and a subordinate entity. An example of RRC protocol is specified in the 3GPP specifications. Compared to the above-described TTI type assignment scheme, the RRC signaling protocol provides less frequent opportunities to change TTI type. In this example, changing TTI type assignment is not dynamic and needs to be done at the RRC level. In some examples, a semi-dynamic configuration may be signaled by a physical control channel, and a semi-static configuration may be signaled at the RRC level (e.g., L1 messages).

FIG. 14 is a diagram illustrating a two-TTI subframe structure 1400 with subbanding in a short TTI at the front of the subframe in accordance with an aspect of the disclosure. The subframe 1400 has a short TTI 1402 at the front followed by a long TTI 1404 and an UL control burst 1412. In this example, short TTI users may be pre-assigned (either semi-dynamically or semi-statically) a subset of subbands (e.g., subbands B, C, D or E) to monitor for DL control information (DCI) in the corresponding control regions 1406 that may contain possible DL data assignment (e.g., PDSCH data). For example, a device assigned subband B only monitors the control region 1406 of subband B, while a device assigned subband C only monitors the control region 1406 of subband C. Each of the control region 1406 may include reference signals (e.g., CRS) that are located at the front of the subframe to facilitate power saving using microsleep and/or dynamic bandwidth switching.

In one aspect of the disclosure, control information for the long TTI users are provided after the short TTI control regions in the long TTI control region 1408. Placing the long TTI control region 1408 in the short TTI 1402 provides the scheduling entity with more time to decode the ACK/NACK from the long TTI users and send the control signal to the long TTI users (e.g., large data users). Symbol(s) after the long TTI control region 1408 but before the long TTI 1404 may carry data for other users in the short TTI. In some examples, the users in subbands C and D may be rate-matched around the long TTI control region 1408. For example, the data of the users in subbands C and D may be located in resource elements that are outside of the control region 1408, as opposed to being punctured out (i.e., displaced) by the control region. The number of symbols between the long TTI control region 1408 and the start of a long TTI data region 1410 may be specified to provide enough time for a long TTI user to dynamically switch its RF bandwidth from the narrower control bandwidth of the control region 1408 to the wider data bandwidth of the date region 1410 in the long TTI.

In some examples, a PFFICH as described above may be provided in certain subbands (e.g., anchor subbands) in the control region 1406 of the short TTI 1402. In this case, a subordinate entity has the capability to communicate in the anchor subband(s) and assigned subband(s). In another case (not illustrated), the PFFICH may be repeated and decodable in every subband (e.g., subbands B, C, D, and E).

FIG. 15 is a diagram illustrating a subframe structure 1500 with control channels based on different reference signals in accordance with an aspect of the disclosure. The subframe structure 1500 may be used in a long TTI as described above. In this example, the control channels are located at the front or beginning symbols (e.g., one or more OFDM symbols) of the subframe 1500. In one aspect of the disclosure, the control channel may be a Physical Downlink Control Channel (PDCCH). In this particular example, two types of reference signals may be used in the same subframe. For example, the subframe 1500 may include a first control channel 1502 for facilitating demodulation with cell-specific reference signals (CRS) (e.g., CRS-based PDCCH) and second control channels 1504 for facilitating demodulation with demodulation reference signals (DMRS) (e.g., DMRS-based PDCCH). The DL reference signals (e.g., CRS or DMRS) may be embedded in the control channels in the first symbol of the subframe so that processing delay may be reduced and can facilitate self-contained subframe operations. For DL channel estimation and demodulation purposes, the CRS may be transmitted on certain predefined time and frequency resource elements in every subframe. The CRS may be used by a UE to demodulate the control channels. The UE-specific demodulation reference signals (DMRS) allows a UE to demodulate the associated data channel without a CRS. In one example, the data channel may be a PDSCH for carrying user data or any data channels.

The control channels are contained in their respective subbands. That is, the entire system bandwidth is partitioned into multiple subbands, and control channel demodulation and decoding can be performed for each subband, independent of other subbands. A user is either assigned to monitor its control channel in certain subband(s), or it may monitor some anchor or common subbands (containing CRS-based PDCCH). Mixed CRS-based PDCCH and DMRS-based PDCCH may be transmitted in one or more OFDM symbols. A CRS-based PDCCH may be transmitted with a wider beam or subband than that of the DMRS-based PDCCH. If a user decodes no DL data assignment in its control channel, it may enter a sleep mode (e.g., microsleep) for the rest of the subframe. Locating the reference signals at the front of the subframe in multiple subbands may reduce the control channel processing time.

Figure 16:
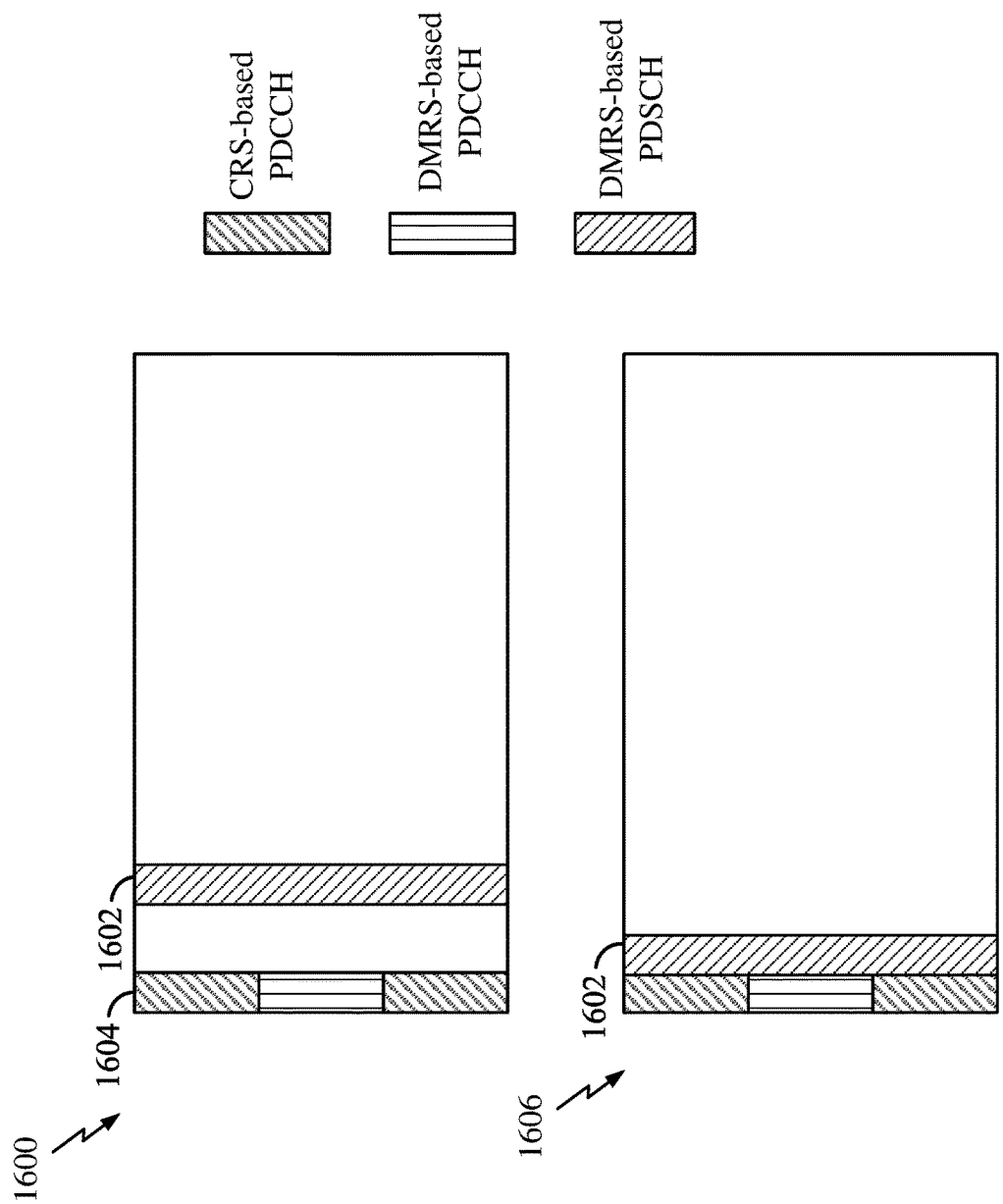
FIG. 16 is a diagram illustrating two examples of subframe structures with different demodulation reference signals (DMRS) placements for data channel according to an aspect of the disclosure.

FIG. 16 is a diagram illustrating two subframe structures with different DMRS placements for the data channel in accordance with an aspect of the disclosure. In a first subframe structure 1600, the DMRS 1602 for the data channel (e.g., PDSCH) is placed in certain symbol(s) such that it may line up with the DMRS in an UL-centric subframe (not shown). The symbol(s) between the PDCCH control region 1604 and DMRS 1602 of the data channel may carry user data (e.g., PDSCH data), or it may carry DL control signaling for other users (e.g., redirection control 1310 in the case of 2-TTI (Long-Short TTI) structure described above). This option can lead to better dynamic TDD operation because the DMRS-based PDSCH 1602 is deferred enough into the subframe such that the scheduling entity and/or subordinate entity is able to measure the UL data interference from other cells so as to perform a suitable mitigation process if needed. In another example subframe 1606, the DMRS-based PDSCH 1602 may be placed immediately after the control region 1604. This option may be more optimized for UE processing.

Figure 17:
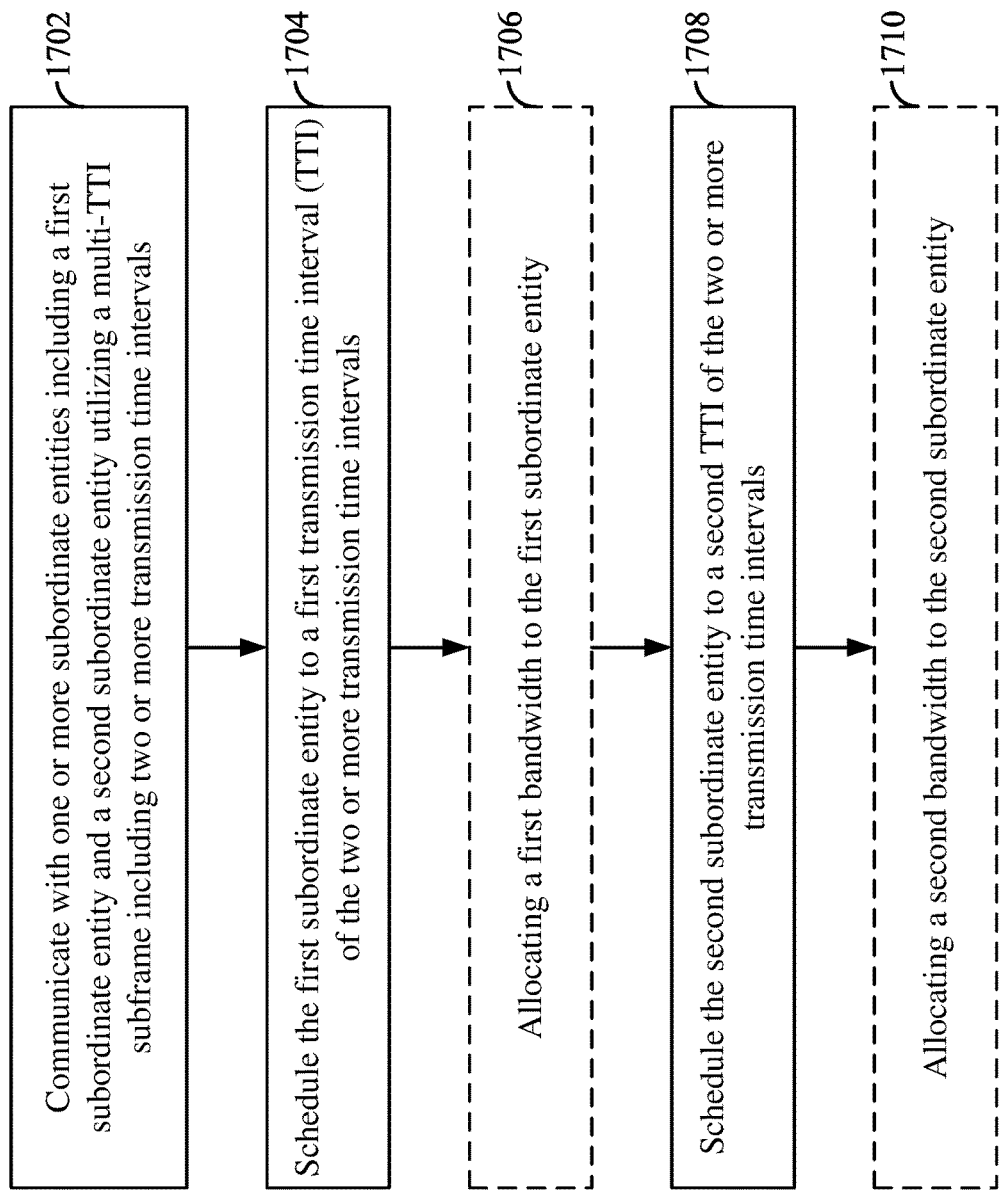
FIG. 17 is a flowchart illustrating a communication process utilizing a multi-TTI subframe according to some aspects of the disclosure.

FIG. 17 is a flowchart illustrating a wireless communication process 1700 utilizing a multi-TTI subframe in accordance with some aspects of the disclosure. At block 1702, a scheduling entity 600 may utilize the communication interface 610 to communicate with one or more subordinate entities 700 (e.g., a first subordinate entity 204 and a second subordinate entity 204) utilizing a multi-TTI subframe comprising two or more transmission time intervals. The multi-TTI subframe may be the same as any of those illustrated in FIGS. 9-16. In one example, the multi-TTI subframe structures 632 of FIG. 6 may be used. In some examples, the multi-TTI subframe is a self-contained subframe including at least one long TTI and at least one short TTI. The multi-TTI subframe may include at least one UL TTI and at least one DL TTI.

At block 1704, the scheduling entity may utilize the multi-TTI SF communication block 604 (e.g., a long TTI control block 622 or a short TTI control block 624 of FIG. 6) to send scheduling information to a first subordinate entity to utilize a first TTI of the two or more transmission time intervals. At block 1706, the scheduling entity may utilize a bandwidth allocation block 620 (see FIG. 6) to allocate a first bandwidth to the first subordinate entity. The assigned first bandwidth may include one or more subbands of the available bandwidth of the scheduling entity. At block 1708, the scheduling entity may utilize the multi-TTI SF communication block 604 (e.g., a long TTI control block 622 or a short TTI control block 624 of FIG. 6) to send scheduling information to the second subordinate entity to utilize a second TTI of the two or more transmission time intervals. The first TTI and the second TTI have different time durations. That is the first TTI may have a time duration longer than or shorter than that of the second TTI. At block 1710, the scheduling entity may utilize the bandwidth allocation block 620 (see FIG. 6) to allocate a second bandwidth to the second subordinate entity. The assigned second bandwidth may include one or more subbands of the available bandwidth of the scheduling entity. In some aspects of the disclosure, the scheduling may include scheduling, assigning, reconfiguring, and releasing resources (e.g., time-frequency resources) for the first and second subordinate entities in the first TTI and second TTI utilizing the multi-TTI subframe structure.

Figure 18:
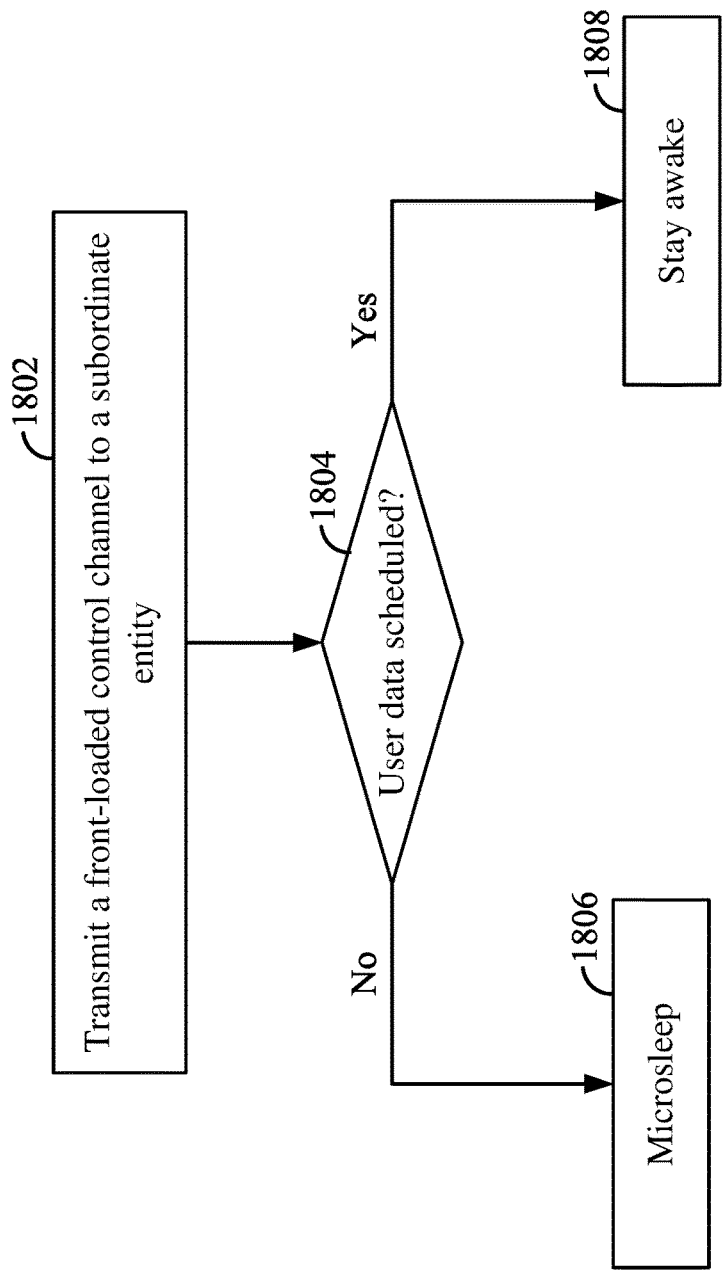
FIG. 18 is a process for utilizing a front-loaded control channel to control a sleep mode operation at a subordinate entity according to one aspect of the disclosure.

Referring to FIG. 18, at block 1802, the scheduling entity may transmit data and/or band assignment information in a front-loaded control channel (e.g., control regions 1306 and 1406 of FIGS. 13 and 14) to the subordinate entities such that a subordinate entity may enter a sleep mode (e.g., microsleep) earlier to conserve power during the multi-TTI subframe. At decision block 1804, based on the assignment information received from the front-loaded control channel, a subordinate entity may determine whether the current multi-TTI subframe has data scheduled for the subordinate entity. At block 1806, if the subordinate entity determines that there is no data scheduled in the current subframe or TTI, it may enable or enter a sleep mode (e.g., microsleep) to conserver power. At block 1808, if the subordinate entity determines that there is data scheduled for the current subframe or TTI, the subordinate entity stays awake during the current subframe.

Figure 19:
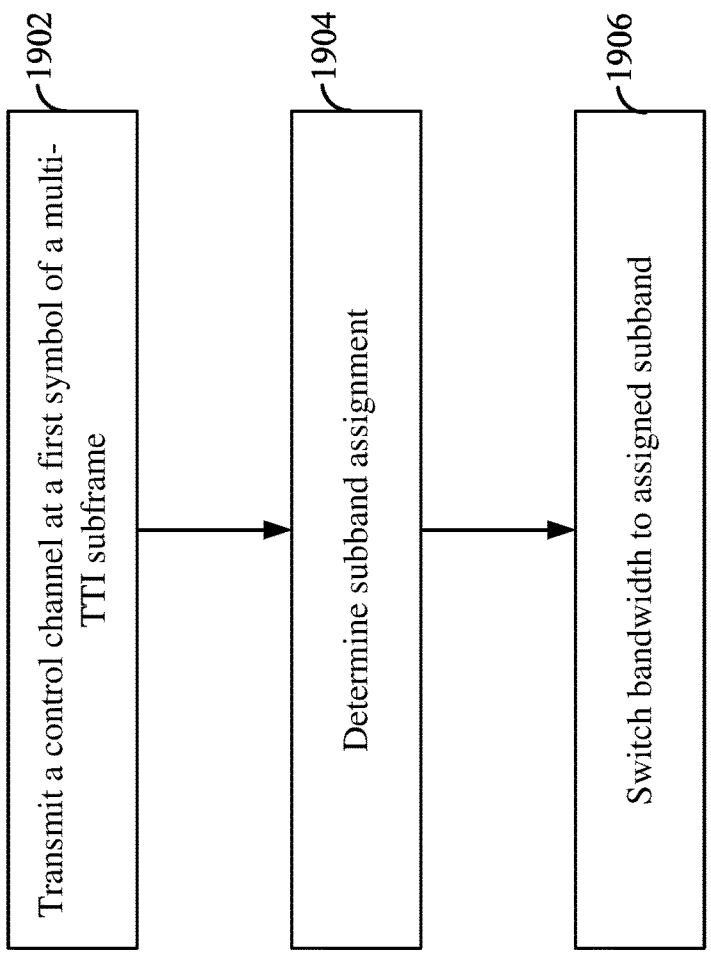
FIG. 19 is a process for utilizing a front-loaded control channel to control a bandwidth switching operation at a subordinate entity according to one aspect of the disclosure.

In some aspects of the disclosure, the scheduling entity may allocate different bandwidths/subbands to different subordinate entities in different TTIs of a multi-TTI subframe. Referring to FIG. 19, at block 1902, the scheduling entity may transmit a front-loaded control channel to the subordinate entities. The front-loaded control channel may be the same as any of the control regions 1306 of FIG. 13. For example, the front-loaded control channel may provide subband assignment information. At block 1904, the subordinate entity may determine its assigned subband or bandwidth from the control channel. For example, the subband may be one of those illustrated in FIGS. 11, 13, 14, 15, and/or 16. At block 1906, the subordinate entity may switch or reconfigure its RF circuitry to utilize the assigned bandwidth/subband for communication with the scheduling entity in the multi-TTI subframe. In some examples, the subordinate entity may be assigned different bandwidths or subbands in different subframes.

In one configuration, the apparatus 600 for wireless communication includes means for communicating with one or more subordinate entities including a first subordinate entity and a second subordinate entity utilizing a multi-TTI subframe that includes two or more transmission time intervals; means for scheduling the first subordinate entity to a first transmission time interval (TTI) of the two or more transmission time intervals; and means for scheduling the second subordinate entity to a second TTI of the two or more transmission time intervals. The first TTI and the second TTI may have different time durations.

In one configuration, the apparatus 700 for wireless communication includes means for communicating with a scheduling entity utilizing a multi-TTI subframe that includes two or more transmission time intervals, as described above in relation to FIGS. 9-19. The apparatus 700 may include means for controlling a sleep mode of the apparatus as described above. The apparatus may further include means for reconfiguring the apparatus 700 (e.g., RF circuitry) to utilize a certain bandwidth or subband assigned by a scheduling entity.

Of course, in the above examples, the circuitry included in the processors 604 and 704 are merely provided as an example, and other means for carrying out the described functions may be included within various aspects of the present disclosure, including but not limited to the instructions stored in the computer-readable storage medium 606 and 706, or any other suitable apparatus or means described in any one of the FIGS. 1, 2, 6 and/or 7, and utilizing, for example, any of the processes and/or algorithms described herein in relation to FIGS. 9-19.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduling entity, comprising:
communicating with one or more subordinate entities including a first subordinate entity and a second subordinate entity utilizing a multi-transmission time interval (multi-TTI) subframe comprising a first transmission time interval (TTI) and a second TTI, the first TTI comprising a first control region and the second TTI comprising a second control region;
transmitting, in the first control region, first scheduling information to the first subordinate entity, the first scheduling information configured to allocate a first bandwidth to the first control region and a second bandwidth to a first data region of the first TTI, the first control region and the first data region separated by a switching time for transitioning between the first bandwidth and the second bandwidth;
transmitting, in the first control region, subband assignment information to the one or more subordinate entities to facilitate a bandwidth switching operation during the second TTI; and
transmitting, in the second control region, second scheduling information to the second subordinate entity to utilize the second TTI based on the subband assignment information.

2. The method of claim 1, wherein the first TTI has a different time duration than the second TTI.

3. The method of claim 1, further comprising:
transmitting data assignment information in a control channel at a first symbol of the multi-TTI subframe to the first and second subordinate entities to expedite the first subordinate entity entering a sleep mode during the multi-TTI subframe when the data assignment information indicates that no data is assigned to the first subordinate entity in the multi-TTI subframe.

4. The method of claim 1, further comprising:
transmitting the subband assignment information in a control channel at a first symbol of the first TTI to the one or more subordinate entities to facilitate the bandwidth switching operation during the second TTI.

5. The method of claim 1, further comprising:
front-loading one or more reference signals in a first symbol of the multi-TTI subframe, the one or more reference signals configured to facilitate at least one of power saving using microsleep or dynamic bandwidth switching during the multi-TTI subframe.

6. The method of claim 1, further comprising:
allocating the first bandwidth to the first subordinate entity and a third bandwidth to the second subordinate entity, wherein the first bandwidth is narrower than the third bandwidth.

7. The method of claim 1, wherein the first bandwidth is narrower than the second bandwidth.

8. The method of claim 1, wherein the first control region in the first TTI is configured to provide control information for the second subordinate entity scheduled to the second TTI.

9. The method of claim 1, further comprising:
transmitting scheduling information to the one or more subordinate entities to utilize different transmission time intervals in the multi-TTI subframe on a subframe by subframe basis.

10. The method of claim 1, further comprising:
transmitting scheduling information to the one or more subordinate entities to utilize different subbands, respectively.

11. The method of claim 1, further comprising:
partitioning the first TTI or second TTI into a plurality of subbands for respective control channels, wherein the control channels are configured to utilize different reference signal modulations.

12. A scheduling entity configured for wireless communication, comprising:
a communication interface configured to communicate with one or more subordinate entities;
a memory comprising executable code; and
a processor coupled to the communication interface and the memory,
wherein the processor is configured by the executable code to:
communicate with the one or more subordinate entities including a first subordinate entity and a second subordinate entity utilizing a multi-transmission time interval (multi-TTI) subframe comprising a first transmission time interval (TTI) and a second TTI, the first TTI comprising a first control region and the second TTI comprising a second control region;
transmit, in the first control region, first scheduling information to the first subordinate entity, the first scheduling information configured to allocate a first bandwidth to the first control region and a second bandwidth to a first data region of the first TTI, the first control region and the first data region separated by a switching time for transitioning between the first bandwidth and the second bandwidth;
transmit, in the first control region, subband assignment information to the one or more subordinate entities to facilitate a bandwidth switching operation during the second TTI; and
transmit, in the second control region, second scheduling information to the second subordinate entity to utilize the second TTI based on the subband assignment information.

13. The scheduling entity of claim 12, wherein the first TTI has a different time duration than the second TTI.

14. The scheduling entity of claim 12, wherein the processor is further configured to:
transmit data assignment information in a control channel at a first symbol of the multi-TTI subframe to the first and second subordinate entities to expedite the first subordinate entity entering a sleep mode during the multi-TTI subframe when the data assignment information indicates that no data is assigned to the first subordinate entity in the multi-TTI subframe.

15. The scheduling entity of claim 12, wherein the processor is further configured to:
transmit the subband assignment information in a control channel at a first symbol of the first TTI to the one or more subordinate entities to facilitate the bandwidth switching operation during the second TTI.

16. The scheduling entity of claim 12, wherein the processor is further configured to:
front-load one or more reference signals in a first symbol of the multi-TTI subframe, the one or more reference signals configured to facilitate at least one of power saving using microsleep or dynamic bandwidth switching during the multi-TTI subframe.

17. The scheduling entity of claim 12, wherein the processor is further configured to:

allocate the first bandwidth to the first subordinate entity and a third bandwidth to the second subordinate entity, wherein the first bandwidth is narrower than the third bandwidth.

18. The scheduling entity of claim 12, wherein the first bandwidth is narrower than the second bandwidth.

19. The scheduling entity of claim 12, wherein the first control region in the first TTI is configured to provide control information for the second subordinate entity scheduled to the second TTI.

20. The scheduling entity of claim 12, wherein the processor is further configured to:
   transmit scheduling information to the one or more subordinate entities to utilize different transmission time intervals in the multi-TTI subframe on a subframe by subframe basis.

21. The scheduling entity of claim 12, wherein the processor is further configured to:
   transmit scheduling information to the one or more subordinate entities to utilize different subbands, respectively.

22. The scheduling entity of claim 12, wherein the processor is further configured to:
   partition the first TTI or second TTI into a plurality of subbands for respective control channels, wherein the control channels are configured to utilize different reference signal modulations.

23. A scheduling entity configured for wireless communication, comprising:
   means for communicating with one or more subordinate entities including a first subordinate entity and a second subordinate entity utilizing a multi-transmission time interval (multi-TTI) subframe comprising a first transmission time interval (TTI) and a second TTI, the first TTI comprising a first control region and the second TTI comprising a second control region;
   means for transmitting, in the first control region, first scheduling information to the first subordinate entity, the first scheduling information configured to allocate a first bandwidth to the first control region and a second bandwidth to a first data region of the first TTI, the first control region and the first data region separated by a switching time for transitioning between the first bandwidth and the second bandwidth;
   means for transmitting, in the first control region, subband assignment information to the one or more subordinate entities to facilitate a bandwidth switching operation during the second TTI; and
   means for transmitting, in the second control region, second scheduling information to the second subordinate entity to utilize the second TTI based on the subband assignment information.

24. The scheduling entity of claim 23, further comprising at least one of:
   means for transmitting data assignment information in a control channel at a first symbol of the multi-TTI subframe to the first and second subordinate entities to expedite the first subordinate entity entering a sleep mode during the multi-TTI subframe when the data assignment information indicates that no data is assigned to the first subordinate entity in the multi-TTI subframe; or
   means for transmitting the subband assignment information in a control channel at a first symbol of the first TTI to the one or more subordinate entities to facilitate the bandwidth switching operation during the second TTI.

25. The scheduling entity of claim 23, further comprising:
   means for front-loading one or more reference signals in a first symbol of the multi-TTI subframe, the one or more reference signals configured to facilitate at least one of power saving using microsleep or dynamic bandwidth switching during the multi-TTI subframe.

26. The scheduling entity of claim 23, further comprising:
   means for transmitting scheduling information to the one or more subordinate entities to utilize different transmission time intervals in the multi-TTI subframe on a subframe by subframe basis.

27. A non-transitory computer-readable storage medium storing executable code that, when executed by a processor of a scheduling entity, causes the scheduling entity to:
   communicate with one or more subordinate entities including a first subordinate entity and a second subordinate entity utilizing a multi-transmission time interval (multi-TTI) subframe comprising a first transmission time interval (TTI) and a second TTI, the first TTI comprising a first control region and the second TTI comprising a second control region;
   transmit, in the first control region, first scheduling information to the first subordinate entity, the first scheduling information configured to allocate a first bandwidth to the first control region and a second bandwidth to a first data region of the first TTI, the first control region and the first data region separated by a switching time for transitioning between the first bandwidth and the second bandwidth;
   transmit, in the first control region, subband assignment information to the one or more subordinate entities to facilitate a bandwidth switching operation during the second TTI; and
   transmit, in the second control region, second scheduling information to the second subordinate entity to utilize the second TTI based on the subband assignment information.

28. The non-transitory computer-readable storage medium of claim 27, wherein the executable code further causes the scheduling entity to, at least one of:
   transmit data assignment information in a control channel at a first symbol of the multi-TTI subframe to the first and second subordinate entities to expedite the first subordinate entity entering a sleep mode during the multi-TTI subframe when the data assignment information indicates that no data is assigned to the first subordinate entity in the multi-TTI subframe; or
   transmit the subband assignment information in a control channel at a first symbol of the first TTI to the one or more subordinate entities to facilitate the bandwidth switching operation during the second TTI.

29. The non-transitory computer-readable storage medium of claim 27, wherein the executable code further causes the scheduling entity to:
   front-load one or more reference signals in a first symbol of the multi-TTI subframe, the one or more reference signals configured to facilitate at least one of power saving using microsleep or dynamic bandwidth switching during the multi-TTI subframe.

30. The non-transitory computer-readable storage medium of claim 27, wherein the executable code further causes the scheduling entity to:
   transmit scheduling information to the one or more subordinate entities to utilize different transmission time intervals in the multi-TTI subframe on a subframe by subframe basis.

* * * * *